United States Patent
Sumioka

(10) Patent No.: US 10,270,371 B2
(45) Date of Patent: Apr. 23, 2019

(54) VIBRATING-ELEMENT DRIVING CIRCUIT, VIBRATION-TYPE ACTUATOR, IMAGE PICKUP APPARATUS, IMAGE GENERATION APPARATUS, AND DUST REMOVAL APPARATUS

(71) Applicant: CANON KABUSHIKI KAISHA, Tokyo (JP)

(72) Inventor: Jun Sumioka, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 302 days.

(21) Appl. No.: 15/108,250

(22) PCT Filed: Dec. 22, 2014

(86) PCT No.: PCT/JP2014/083841
§ 371 (c)(1),
(2) Date: Jun. 24, 2016

(87) PCT Pub. No.: WO2015/098800
PCT Pub. Date: Jul. 2, 2015

(65) Prior Publication Data
US 2016/0329836 A1   Nov. 10, 2016

(30) Foreign Application Priority Data

Dec. 26, 2013 (JP) ................. 2013-269678
Dec. 18, 2014 (JP) ................. 2014-256709

(51) Int. Cl.
*H02N 2/10* (2006.01)
*H02N 2/00* (2006.01)
(Continued)

(52) U.S. Cl.
CPC ....... *H02N 2/0075* (2013.01); *G02B 27/0006* (2013.01); *G02B 27/646* (2013.01);
(Continued)

(58) Field of Classification Search
CPC ..... H02N 2/142; H02N 2/0075; H04N 5/2171
See application file for complete search history.

(56) References Cited

U.S. PATENT DOCUMENTS

| 5,777,444 A | 7/1998 | Motegi |
| 2012/0194910 A1* | 8/2012 | Sumioka ............... B06B 1/0215 359/507 |
| 2017/0082828 A1* | 3/2017 | Sumioka .................. G02B 7/04 |

FOREIGN PATENT DOCUMENTS

| CN | 101686022 A | 3/2010 |
| JP | 1-107680 A | 4/1989 |

(Continued)

*Primary Examiner* — J. San Martin
(74) *Attorney, Agent, or Firm* — Canon U.S.A., Inc. IP Division

(57) ABSTRACT

In a vibrating-element driving circuit including a transformer and a coil as elements for stepping up a voltage, an improvement in a circuit efficiency of the driving circuit is achieved. The vibrating-element driving circuit includes a transformer, and an inductor connected to a primary side of the transformer, wherein an alternating voltage is applied to a primary winding coil of the transformer, an electromechanical energy conversion element of the vibration-type actuator is connected in parallel to a secondary winding coil of the transformer, the inductor is connected in series to the primary winding coil of the transformer, and wherein when the inductance of the inductor is Le1, the inductance of the primary winding coil of the transformer is L1, and Ka=L1/Le1, then the following is satisfied: $1 \leq Ka \leq 10$.

20 Claims, 21 Drawing Sheets

(51) Int. Cl.
*G02B 27/64* (2006.01)
*H02N 2/14* (2006.01)
*H02N 2/16* (2006.01)
*G02B 27/00* (2006.01)
*H04N 5/217* (2011.01)

(52) U.S. Cl.
CPC ........... *H02N 2/0015* (2013.01); *H02N 2/103* (2013.01); *H02N 2/142* (2013.01); *H02N 2/163* (2013.01); *H04N 5/2171* (2013.01)

(56) References Cited

FOREIGN PATENT DOCUMENTS

| | | | |
|---|---|---|---|
| JP | 4-042788 | A | 2/1992 |
| JP | 4-222477 | A | 8/1992 |
| JP | 5-111267 | A | 4/1993 |
| JP | 2618685 | B2 | 6/1997 |
| JP | 2001-136764 | A | 5/2001 |
| JP | 3165701 | B2 | 5/2001 |
| JP | 2002-101673 | A | 4/2002 |
| JP | 2011-109882 | A | 6/2011 |
| JP | 2013-247800 | A | 12/2013 |

* cited by examiner

FIG. 1
(a)
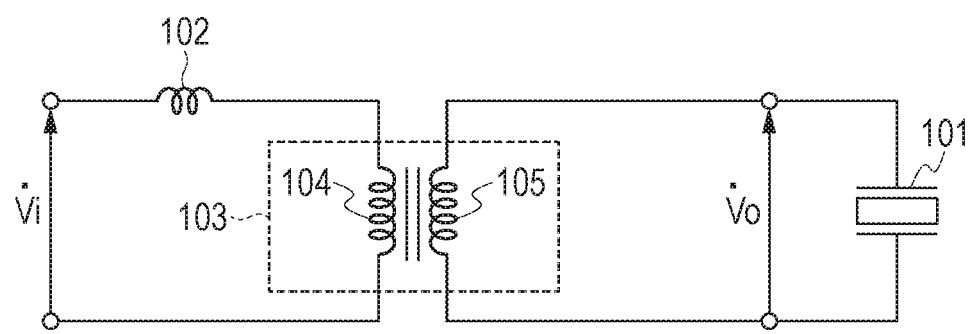
(b)
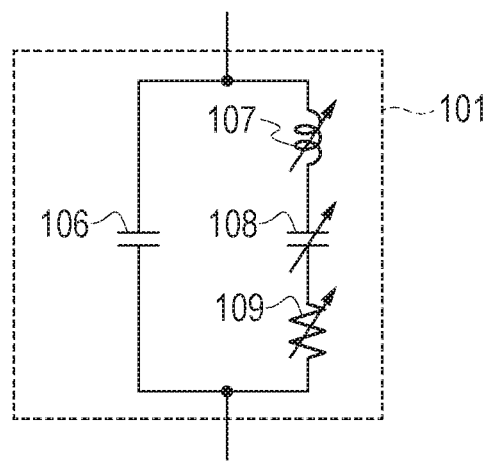

FIG. 9
(a)
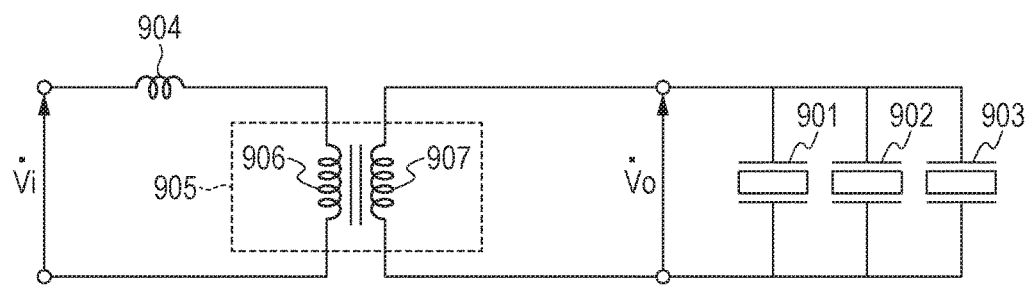
(b)
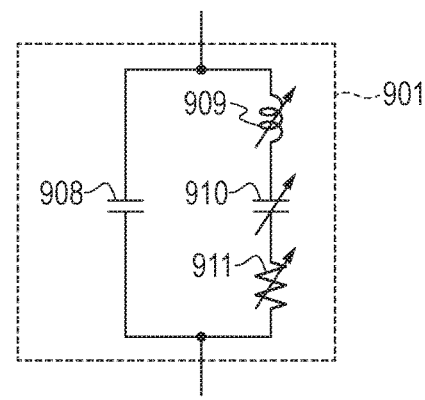

FIG. 20
(a)
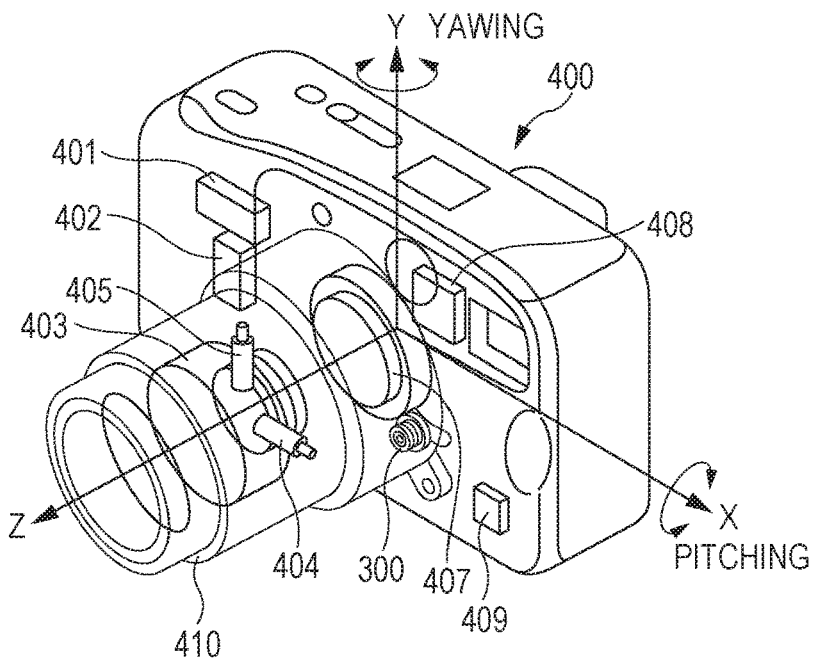
(b)
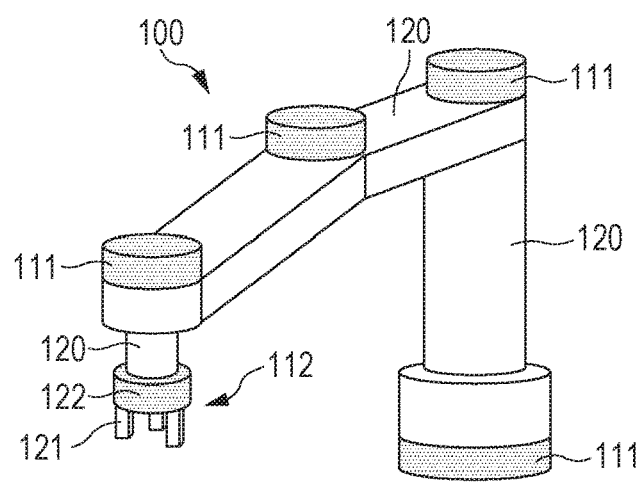

VIBRATING-ELEMENT DRIVING CIRCUIT, VIBRATION-TYPE ACTUATOR, IMAGE PICKUP APPARATUS, IMAGE GENERATION APPARATUS, AND DUST REMOVAL APPARATUS

TECHNICAL FIELD

The present invention relates to a vibrating-element driving circuit, a vibration-type actuator, an image pickup apparatus, an image generation apparatus, and a dust removal apparatus.

BACKGROUND ART

A vibration-type actuator is a non-electromagnetic actuator configured to generate a high-frequency vibration in an electro-mechanical energy conversion element connected to an elastic element by applying an alternating voltage to the electro-mechanical energy conversion element such that vibration energy is output in the form of continuous mechanical motion.

The vibration-type actuator is used, for example, in autofocus driving in a camera. In the autofocus driving, a high-accuracy positioning control is necessary. To this end, a position feedback control using a position sensor is performed. In a control circuit that performs the feedback control, a control parameter is calculated based on a deviation of a position signal detected by the position sensor from a position command value.

It is possible to control a speed of the vibration-type actuator by adjusting a control parameter such as a driving frequency, a phase difference between two-phase driving voltage signals applied to an electro-mechanical energy conversion element of a piezoelectric element or the like, a driving pulse width, or the like. For example, a greater exciting amplitude is obtained by setting the driving frequency closer to a resonance frequency of the piezoelectric element, and thus it is possible to drive a lens, which is a driving target object, at a high speed. A driving frequency signal with a rectangular wave form is generated by a pulse generator based on the control parameter described above, and the driving frequency signal is stepped up to a particular alternating voltage by the driving circuit. It is possible to control the positioning of the vibration-type actuator by repeatedly applying the alternating voltage to the piezoelectric element while controlling the control parameter.

The driving circuit is described in detail below. The driving circuit has a function of stepping up a rectangular wave signal input from the pulse generator by a factor of several to several tens by using a coil, a transformer, or the like and outputting a resultant sinusoidal alternating voltage. The signal of the pulse generator is on/off-controlled by a switching circuit in terms of the frequency and the pulse duty and adjusted according to the driving frequency.

The driving circuit using the coil is an LC step-up circuit configured to electrically amplifying a signal with a particular frequency by using LC resonance of inductance of a coil and capacitance of the piezoelectric element. The step-up ratio thereof is generally in a range of about 1.5 to 3. The step-up circuit using the transformer is used when a further larger step-up ratio is required. The step-up ratio thereof can be freely adjusted by a turn ratio between a primary winding coil and a secondary winding coil of the transformer. In general use, the step-up ratio is in a range of about 3 to 30. In many cases, the step-up circuit using the transformer is used when the vibrating element needs a large driving voltage in a range of about 100 to 500 Vpp. In the transformer step-up circuit, by providing a coil element in series to the piezoelectric element on the primary side or the secondary side of the transformer, it is possible to more effectively remove harmonic components in generating the sinusoidal wave.

A conventional technique associated with a circuit using a transformer for driving a vibration-type actuator is described below.

PTL 1 discloses a piezoelectric vibrating element driving circuit configured to drive a piezoelectric vibrating element at a frequency close to a resonance frequency by using a one-transistor switching circuit and a transformer. By disposing a coil with a proper inductance on the secondary side of the transformer such that the coil is connected in series to the piezoelectric vibrating element, a nearly sinusoidal wave is obtained in the voltage and the current of the piezoelectric vibrating element, and, according to the phase of its current wave form, the driving frequency is controlled.

PTL 2 discloses a vibration motor in which an inductance element is connected to a driving electrode of the vibration motor, and a capacitance element is connected in parallel to an equivalent circuit of the motor such that an optimized motor performance is obtained. As an example, a driving circuit using a transform is disclosed.

PTL 3 discloses a driving circuit such as that described below. That is, the driving circuit for an ultrasonic motor disclosed in PTL 3 includes an oscillator which is a reference-frequency oscillation circuit and which generates a high-frequency signal for driving the ultrasonic motor, and buffer elements that receive the high-frequency signal from the oscillator and drive switching transistors in the driving circuit. The driving circuit further includes full-bridge switching transistors that turn on/off the conduction of the high-frequency signal via the buffer elements, a transformer for stepping up a low voltage of driving high-frequency power, and a coil for shaping a waveform output from the transformer.

PTL 4 discloses a driving circuit in which variable control means is disposed for controlling a duty ratio of high-frequency power to be applied to a piezoelectric vibrating element serving as a rotation driving source of an ultrasonic motor thereby compensating for a change in speed caused by a change in load, which makes it unnecessary to use a chopper circuit (DC-DC conversion circuit) for controlling the voltage. That is, in the circuit disclosed, power-isolated-type half bridges are combined so as to function as an inverter circuit that supplies high-frequency power to the piezoelectric element. A pulse output from the inverter circuit is applied to the piezoelectric element via a step-up transformer. Frequency control means is provided to correct a fluctuation caused by a disturbance on a load such that the high-frequency power applied to the piezoelectric element is fed back via a step-down transformer to variably control the output frequency of the inverter circuit. Furthermore, in the disclosed technique, based on the output from the frequency control means and a voltage detected by means of detecting a vibration state of the piezoelectric element, the width of a rectangular wave pulse is varied by pulse width control means and the resultant output is input to the inverter circuit. In the description of the disclosure, when a reduction in the rotation speed occurs, the pulse width of the rectangular wave is increases, but when an increase in the rotation speed occurs, the pulse width of the rectangular wave is reduced.

PTL 5 discloses a driving circuit including an oscillator that outputs a reference signal in the form of a pulse train, and a frequency tracking circuit that controls the frequency of the reference signal output from the oscillator so as to be equal to a driving frequency optimum for the ultrasonic motor. This driving circuit further includes a photosensor that detects a rotation speed of a rotation part of the ultrasonic motor, and pulse width modulation means for modulating the pulse width of the reference signal such that the rotation speed detected by the photosensor becomes equal to a target rotation speed. This driving circuit further includes a power amplifier that supplies a drive signal with an amplitude corresponding to the modulation of the pulse width provided by the pulse width modulation means to an electrode of the piezoelectric element. The driving circuit disclosed is capable of changing the amplitude of the ultrasonic motor driving voltage output from the power amplifier, i.e., the step-up transformer by modulating the pulse width of the reference signal thereby accurately controlling the rotation speed. Thus, this driving circuit disclosed is capable of controlling the pulse width and the oscillation frequency by using the output from the photosensor and the feedback signal of the frequency tracking circuit thereby precisely and accurately controlling the rotation speed of the ultrasonic motor.

As described above, driving circuits using a transformer for controlling a vibration-type actuator and control techniques thereof have been proposed.

CITATION LIST

Patent Literature

PTL1: Japanese Patent No. 2618685
PTL2: Japanese Patent No. 3165701
PTL3: Japanese Patent Laid-Open No. 1-107680
PTL4: Japanese Patent Laid-Open No. 4-222477
PTL5: Japanese Patent Laid-Open No. 5-111267

SUMMARY OF INVENTION

Technical Problem

In a vibrating-element driving circuit, there is a need for improving a circuit efficiency of a driving circuit including a transformer and a coil as elements for stepping up a voltage.

Solution to Problem

The improvement in the circuit efficiency can be achieved by adjusting the electric resonance frequency. By adjusting the electric resonance frequency in a lower frequency range by using smaller inductance for a transformer and a coil such that a sinusoidal driving waveform with small harmonic distortion is generated thereby making it possible to reduce an unnecessary current and thus making it possible to improve the circuit efficiency.

In an aspect, the present invention provides a driving circuit for driving a vibration-type actuator including a transformer, an inductor connected to a primary side of the transformer, wherein an alternating voltage is applied to a primary winding coil of the transformer, an electro-mechanical energy conversion element of the vibration-type actuator is connected in parallel to a secondary winding coil of the transformer, the inductor is connected in series to the primary winding coil of the transformer, and wherein when the inductance of the inductor is $Le1$, the inductance of the primary winding coil of the transformer is $L1$, and $Ka=L1/Le1$, then the following is satisfied: $Ka \leq 10$.

In an aspect, the present invention provides a driving circuit for driving a vibration-type actuator including a transformer, an inductor connected to a secondary side of the transformer, wherein an alternating voltage is applied to a primary winding coil of the transformer, an electro-mechanical energy conversion element is connected in parallel to a secondary winding coil of the transformer, the inductor is connected in parallel to the electro-mechanical energy conversion element on the secondary side of the transformer, and wherein when the inductance of the inductor is $Le2$, the inductance of the secondary winding coil of the transformer is $L2$, and $Ka=L2/Le2$, then the following is satisfied: $Kb \leq 10$.

Furthermore, in an aspect, the present invention provides a vibrating-element driving circuit including a transformer, and an inductor connected to a secondary side of the transformer, wherein an alternating voltage is applied to a primary winding coil of the transformer, N electro-mechanical energy conversion elements are connected in parallel to the secondary winding coil of the transformer, the inductor is connected in parallel to the electro-mechanical energy conversion element on the secondary side of the transformer, and wherein when a turn ratio of the transformer is R, the inductance of the primary winding coil of the transformer is $L1$, and the inductance of the secondary winding coil of the transformer is $Ln2$, the following is satisfied: $Ln2 = L1 \cdot R^2 / N$.

Advantageous Effects of Invention

An aspect of the present invention provides a low-consumption-power vibrating-element driving circuit, a vibration-type actuator including such a driving circuit, an image pickup apparatus, an image forming apparatus, or a dust removal apparatus.

BRIEF DESCRIPTION OF DRAWINGS

FIG. 1 is a diagram illustrating a vibrating-element driving circuit according to an embodiment of the present invention.

FIG. 9 is a diagram illustrating a vibration-type actuator including a plurality of vibrating elements and a driving circuit therefor according to an embodiment.

FIG. 11 is an exploded perspective view of a rod-shape vibration-type actuator used in autofocus driving of a camera lens or the like.

FIG. 20 schematically illustrates structures of a digital camera and a robot, which are examples of apparatuses including a vibrating-element driving circuit according to a fourth embodiment of the present invention.

DESCRIPTION OF EMBODIMENTS

Figure 2:
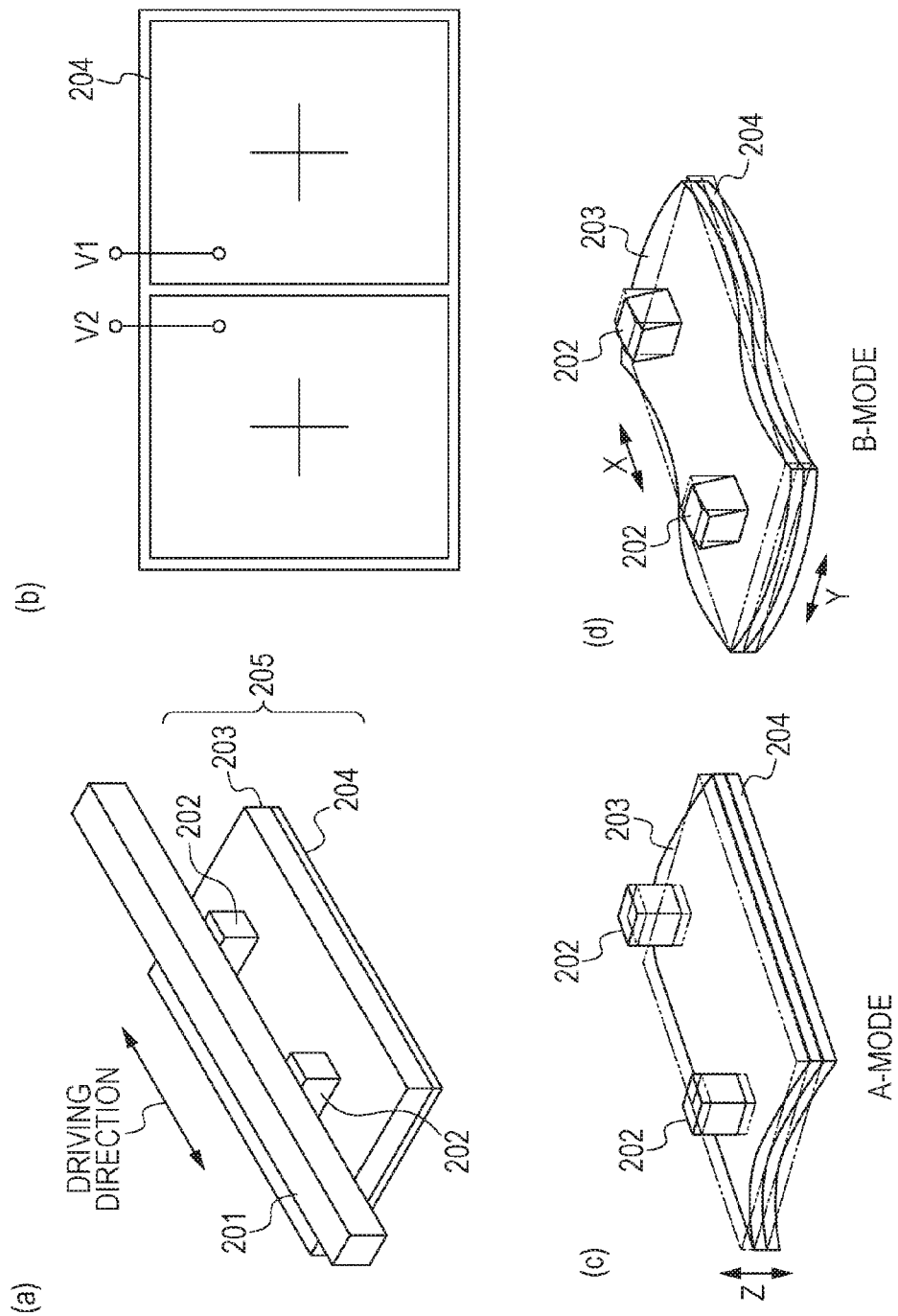
FIG. 2 is a diagram illustrating a principle of driving a vibration-type actuator according to an embodiment of the present invention.

Referring to drawings, examples of embodiments of the present invention are described below. Note that the present invention is not limited to those embodiments, but other embodiments are possible without departing from the scope of the invention.

In the present application, a vibrating element includes an electro-mechanical energy conversion element such as a piezoelectric element, and an elastic element connected to the electro-mechanical energy conversion element. An oscillator includes the vibrating element and a moving element. A vibration-type actuator includes the oscillator and a vibrating-element driving circuit.

According to an aspect of the present invention, it is possible to realize a low-power-consumption vibration-type actuator. It is also possible to generate a sinusoidal driving waveform with small harmonic distortion, and thus it is possible to suppress a spurious vibration of the vibrating element caused by the circuit, which makes it possible to achieve a good control performance. Furthermore, it is possible to design constants of circuit elements so as to be capable of easily produced, which makes it possible to reduce an installation area of the circuit. According to an aspect of the present invention, the effects described above can be achieved for a wide variety of configurations and parameters in terms of the resonance frequency, the capacitance of the piezoelectric element, driving a plurality of oscillators, etc.

First Embodiment

A vibrating-element driving circuit and a vibration-type actuator according to the present invention are described with reference to drawings. The driving circuit according to the present invention is applicable to a vibrating element such as that described below. That is, the vibrating element driven by the driving circuit according to the present invention includes an electric-mechanical energy conversion element such as a piezoelectric element and an elastic element connected to the electro-mechanical energy conversion element. The oscillator includes the vibrating element and a moving element that is urged into contact with the elastic element and that moves relative to the vibrating element. The electro-mechanical energy conversion element is applied with a plurality of alternating voltages that are different in phase thereby generating a vibration in the elastic element. The generated vibration causes the elastic element to have an elliptic motion at a driving part (part in contact with the moving element) of the elastic element, and this elliptic motion causes the moving element to move relative to the elastic element. The driving circuit according to the present embodiment may be applied, for example, as a vibrating-element driving circuit including an electro-mechanical energy conversion element and a plate-shape elastic element connected to the electro-mechanical energy conversion element. The elastic element includes a protrusion-shape driving part in frictional contact with the moving element such that an elliptic motion occurs in the driving part when an alternating voltage is applied to the electro-mechanical energy conversion element.

The present embodiment is described taking as an example a two-phase driving circuit configured to drive the piezoelectric element serving as the electro-mechanical energy conversion element separately in two phases. In the two-phase driving, there is no difference between a first phase and a second phase except that there is a phase difference of ±90° between alternating voltages applied to the respective phases, and thus the following description is given only as to driving of one phase. Note that the present invention is not limited to the two-phase driving, but the invention may be applied to a wide variety of driving schemes such as a four-phase or a larger number of phase travelling-wave-type actuator or the like. The oscillator that generates the alternating signal and the switching circuit are not essential parts of the invention, and there is no particular restriction on them. Thus, the following description is given as to such a part of the driving circuit in which an alternating voltage with an amplitude of Vi is input and an alternating voltage with an amplitude of Vo is output and applied to the vibrating element.

FIG. 1($a$) is a diagram illustrating a vibrating-element driving circuit and a vibration-type actuator according to an embodiment of the present invention. The driving circuit is configured such that a secondary winding coil 105 of a transformer 103 is connected in parallel to a vibrating element 101, and an inductor 102 is connected in series to a transformer primary winding coil 104. In this configuration, as for the inductor 102, an inductance element such as a coil may be used. The inductor 102 is generally used to remove harmonic components and adjust electric resonance.

Figure 16:
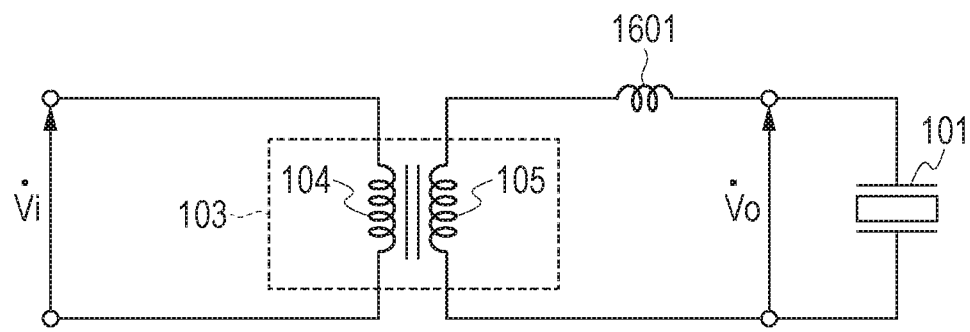
FIG. 16 is a diagram illustrating a vibration-type actuator including a vibrating element and a driving circuit therefor according to the second embodiment.

In the present invention, also taking into account a relation with circuit constants of the transformer, the inductor 102 may adjusts the electric resonance frequency, ensure a sufficient driving voltage, improve a circuit efficiency, or reduce magnetic noise. In FIG. 1(a), the inductor 102 is connected to an upper side of the transformer primary winding coil 104. Instead, the inductor 102 may be connected to a lower side to achieve an equivalent circuit configuration. Herein, the turn ratio of a transformer secondary winding coil 105 to the primary winding coil 104 is set to 16. Although it may be common to connect the inductor 1601 in series to the transformer secondary winding coil 105 as shown in FIG. 16, it is devised, in the present embodiment, to connect the inductor 1601 to the primary side of the transformer as shown in FIG. 1(a). This can be achieved because of the mutual induction effect of the transformer, that is, when a coil with a particular inductance provided on the secondary side is equivalent in impedance to a coil provided on the primary side having an inductance which is as small as 1/(the square of the turn ratio) times the inductance of the coil provided on the secondary side, and thus a similar electric characteristic is obtained. By providing the inductor 102 on the primary side of the transformer as in the present invention, it is allowed for the inductor 102 used to have a small inductance, and thus it becomes possible to reduce a circuit installation area.

In the present invention, to achieve an improvement in circuit efficiency and a reduction in magnetic noise and to, at the same time, remove harmonic components, it is preferable that the transformer used here has generally high magnetic coupling and more specifically a coupling factor Tk of about 0.95 to 0.98. When the coupling factor is low, the transformer has a large leakage magnetic flux which causes a reduction in efficiency of the transformer. Therefore, use of a leakage transformer, which is used to prevent an excessive voltage, results in an increase in magnetic noise and an increase in power consumption, and thus the leakage transformer is not suitable for use in the driving circuit according to the present invention.

Now, an equivalent circuit of the vibrating element 101 is described with reference to FIG. 1(b). FIG. 1(b) represents, in the form of an equivalent circuit, a one-phase part of the vibrating element 101. The equivalent circuit of the vibrating element 101 includes an RLC series circuit corresponding to a mechanical vibrating part and a capacitor 106 having an intrinsic capacitance Cd of the vibrating element 101 and connected in parallel with the RLC series circuit. The RLC series circuit corresponding to the mechanical vibrating part includes an equivalent coil 107 with a self-inductance Lm, an equivalent capacitor 108 with a capacitance Cm, and an equivalent resistor 109 with a resistance value Rm. In the present embodiment, constants of the vibration-type actuator are set such that Lm is 50 mH, Cm is 65 pF, Rm is 3 kΩ, and Cd is 0.54 nF.

In the present invention, if a mechanical resonance frequency of the vibrating element 101 is defined by fm, then fm is given as follows.

[Math. 1]

$$fm = 1/(2\pi\sqrt{LmCm}) \quad \text{(Eq. 1-1)}$$

In the present embodiment, fm is set to 88 kHz.

FIG. 2 is a diagram illustrating a principle of driving of a linear-type vibration wave driving apparatus according to the present embodiment.

In FIG. 2(a), two vibration modes such as those shown in FIGS. 2(c) and 2(d) are generated by applying an alternating voltage to a piezoelectric element 204 bonded to an elastic element 203 thereby causing a moving element 201 in pressure contact with a protrusion 202 to move in a direction denoted by an arrow.

FIG. 2(b) is a diagram illustrating an electrode pattern of the piezoelectric element 204. For example, an electrode region equally divided into two parts in a longitudinal direction is formed on the piezoelectric element 204 of the vibrating element 205.

In each electrode region, a piezoelectric layer has the same polarization direction (+).

Of the two electrode regions of the piezoelectric element 204, one electrode region located on the right side in FIG. 2(b) is applied with an alternating voltage (V1), and an electrode region located on the left side is applied with an alternating voltage (V2).

When V1 and V2 are alternating voltages having a frequency close to a resonance frequency in an A-mode and having the same phase, the whole piezoelectric element 204 (the two electrode regions) expands at a certain moment and contracts at another moment.

As a result, a vibration in the A-mode occurs in the vibrating element 205 as shown in FIG. 2(c).

In a case where V1 and V2 are alternating voltages which have a frequency close to a resonance frequency in a B-mode and which are different in phase by 180°, the right-side electrode region of the piezoelectric element 204 contracts and the left-side electrode region expands at a certain moment.

At another moment, the expansion and the contraction are reversed. As a result, a vibration in the B-mode occurs in the vibrating element 205 as shown in FIG. 2(d).

By combining the two vibration modes described above, the moving element 201 is driven in the direction denoted by the arrow in FIG. 2(a)

By changing a phase difference of the alternating voltages applied to the two equally divided electrodes, it is possible to change an occurrence ratio between the A-mode and the B-mode.

In this vibrating element, it is possible to change the speed of the moving element by changing the occurrence ratio.

Figure 3:
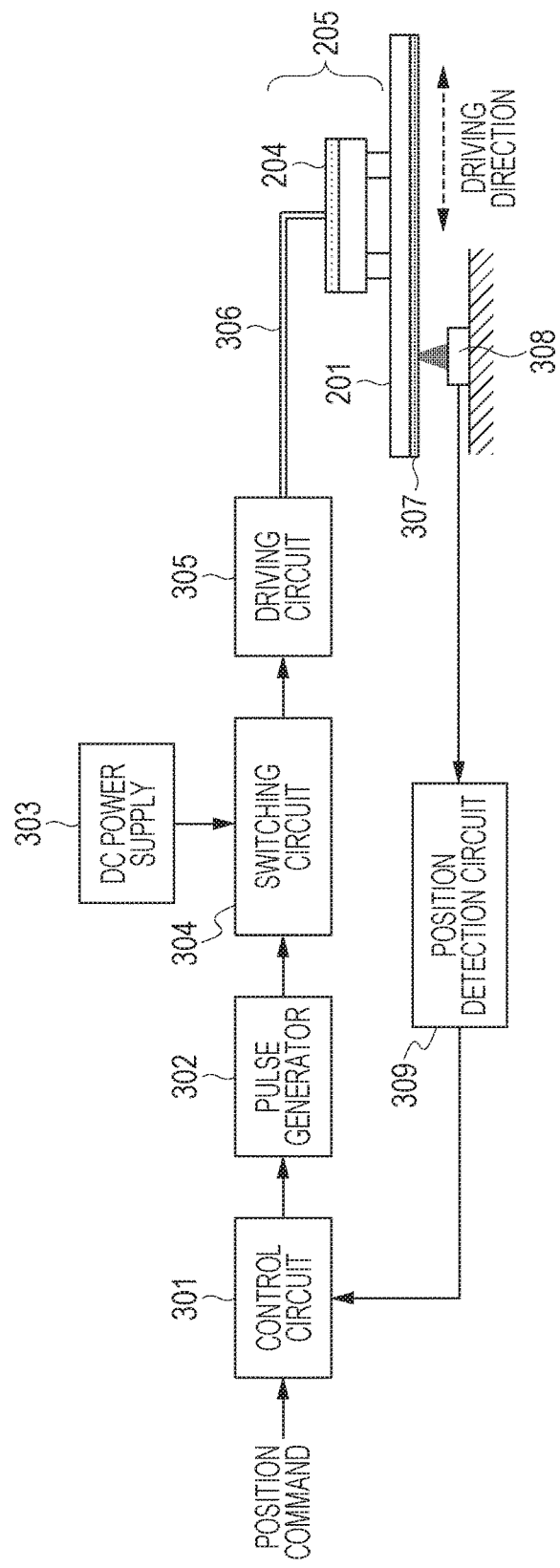
FIG. 3 is a diagram illustrating a position feedback control system using a vibrating-element driving circuit according to an embodiment of the present invention.

FIG. 3 is a diagram illustrating a position feedback control system using a driving circuit for driving a vibration-type actuator according to an embodiment of the present invention.

A position command is given from a not-shown controller and input to a control circuit 301. The control circuit 301 calculates a deviation based on a difference between a detected position obtained in the position detection circuit 309 and the position command. Based on deviation information, the control circuit 301 performs a calculation using a PID compensator disposed in the inside of the control circuit 301 to output a control signal serving as a driving parameter. In the PID compensator, outputs from compensators respectively handling a proportional component (P), an integral component (I), and a derivative component (D) are added together, thereby compensating for a phase delay or a gain of a control target. The PID compensator is generally used to realize a stable and high-precision control system.

A control signal including information in terms of a frequency, a phase difference, and a pulse width which are control parameters of the vibrating element is output from the control circuit and input to a pulse generator 302. The pulse generator 302 generates a pulse signal with a driving frequency varying according to the input control signal. A digital frequency divider circuit or a VCO (voltage-controlled oscillator) is used as the pulse generator 302. Alternatively, the pulse signal may be generated by PWM (pulse width modulation) control so as change the pulse width depending on the control signal. The pulse signal output from the pulse generator 302 is input to a switching circuit 304, which in turn outputs two-phase alternating voltages which are different in phase by 90°. The switching circuit 304 switches a direct-current voltage supplied from DC power supply 303 in synchronization with timing of the input pulse signal thereby generating a rectangular alternating voltage. The alternating voltage is input to a driving circuit 305 configured as illustrated in FIG. 1(a), and a driving voltage with a desired increased voltage is generated.

The alternating voltage in the form of a sine wave output from the driving circuit 305 is applied to the piezoelectric element 204 via a flexible tube 306, and thus a relative movement occurs between the vibrating element 205 and the moving element 201. A relative position of a position scale 307 attached to the moving element 201 is detected by a position sensor 308, and position information is detected by the position detection circuit 309. The position information is input to the control circuit 301 and the vibrating element 205 is feedback-controlled so as to get close to the position command.

Figure 4:
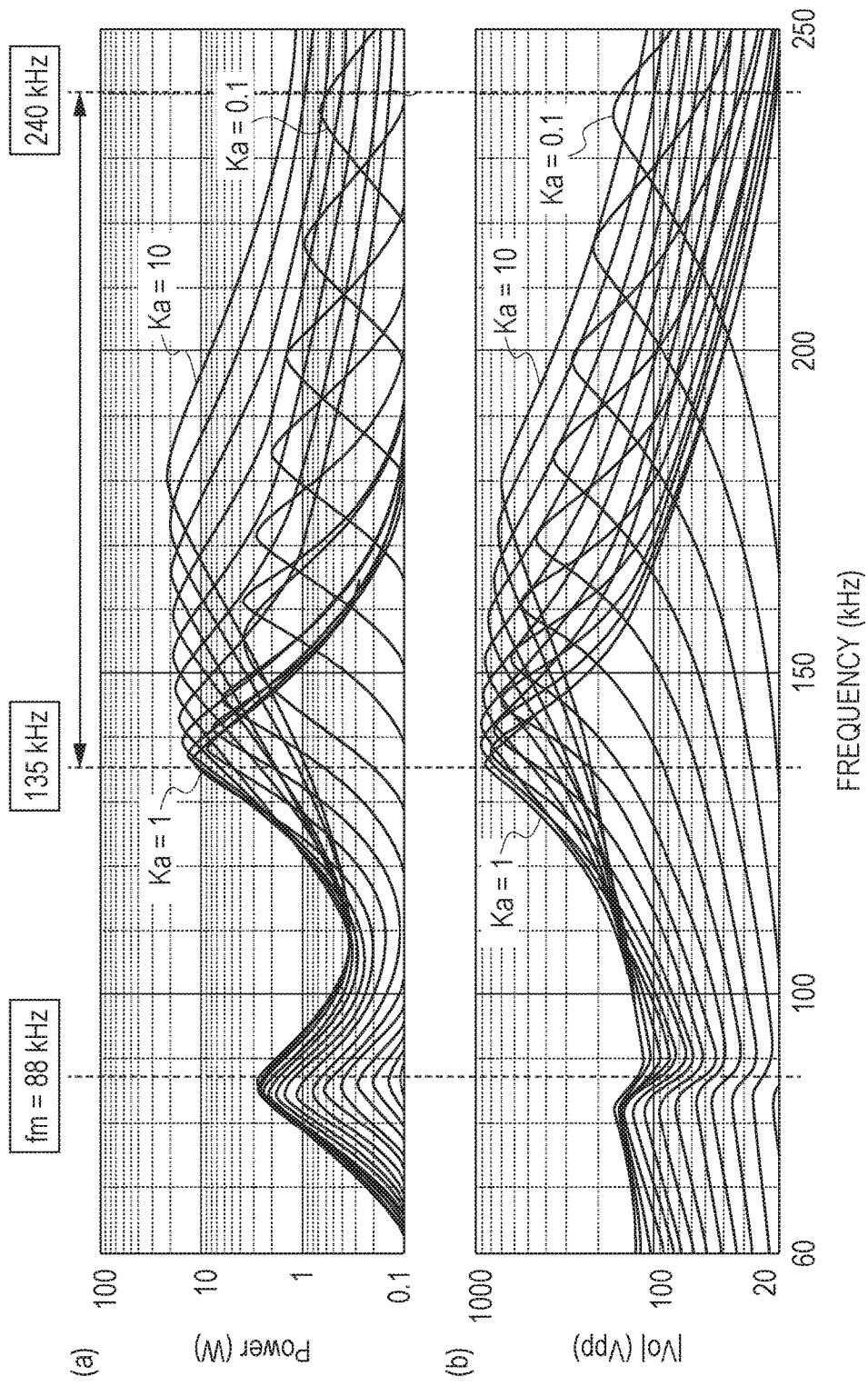
FIG. 4 is a diagram illustrating a result of a calculation of power and an output voltage of a driving circuit according to an embodiment of the present invention.

FIG. 4 is a diagram illustrating a result of a calculation of power and an output voltage of a driving circuit according to an embodiment of the present invention. In this calculation, the driving circuit is assumed to have the configuration and circuit constants shown in FIG. 1(a). FIG. 4(a) shows power consumed by the whole circuit, and FIG. 4(b) shows an alternating voltage Vo on the output side (the voltage applied to the piezoelectric element). The power consumption was calculated for the condition that the coil has a series resistance of 0.9Ω and a secondary winding coil of the transformer has a resistance of 80Ω taking into account equivalent circuit constants of the piezoelectric element. Furthermore, the alternating voltage Vi on the input side was set to 6 Vpp and the step-up ratio of the transformer was set to about 16. A horizontal axis represents a frequency. The mechanical resonance frequency fm of the vibrating element was 88 kHz, and thus a driving frequency range was set to 90 to 100 kHz. The vibrating element used in the present embodiment can be started with a frequency equal to or lower than 100 kHz and the vibrating element is started with a low speed. It is possible to increase the speed by sweeping down the driving frequency toward the mechanical resonance frequency. If the driving frequency is decreased beyond the mechanical resonance frequency, the vibrating element has a fall-from-cliff phenomenon, which causes the vibration to stop suddenly. In this case, it is impossible to restart driving even if the frequency is increased again. To achieve stable driving, a frequency higher than 90 kHz is used. In the driving frequency range described above, a change in power and a change in driving voltage are considered. Herein let fe denote an electric resonance peak frequency of a circuit including a coil disposed on the input voltage side, a transformer, and intrinsic capacitance Cd of the piezoelectric element. If the driving frequency of the vibrating element is set to be in a frequency range higher than fm and lower than the electric resonance frequency fe of the whole circuit described below (135 to 240 kHz in the example shown in FIG. 4), it is possible to perform driving in a range in which a change in driving voltage is gradual, and it is possible to suppress an abrupt change in speed. Thus it is possible to realize a high-performance vibration-type actuator capable of driving a vibrating element with high accuracy.

Herein let Le1 denote the inductance of a coil 102 disposed on the voltage-input side, and L1 denote the inductance of the transformer primary winding coil 104. The inductance ratio thereof is defined by Ka as described below.

$$Ka = L1/Le1 \quad \text{(Eq. 1-2)}$$

Ka described above is a generalized parameter defined to make it possible to handle a change in mechanical resonance frequency of the vibrating element or a change in intrinsic capacitance. That is, if Ka is set within a proper range according the present invention, it is possible to achieve a circuit whose configuration is optimized to drive the vibration-type actuator.

Figure 15:
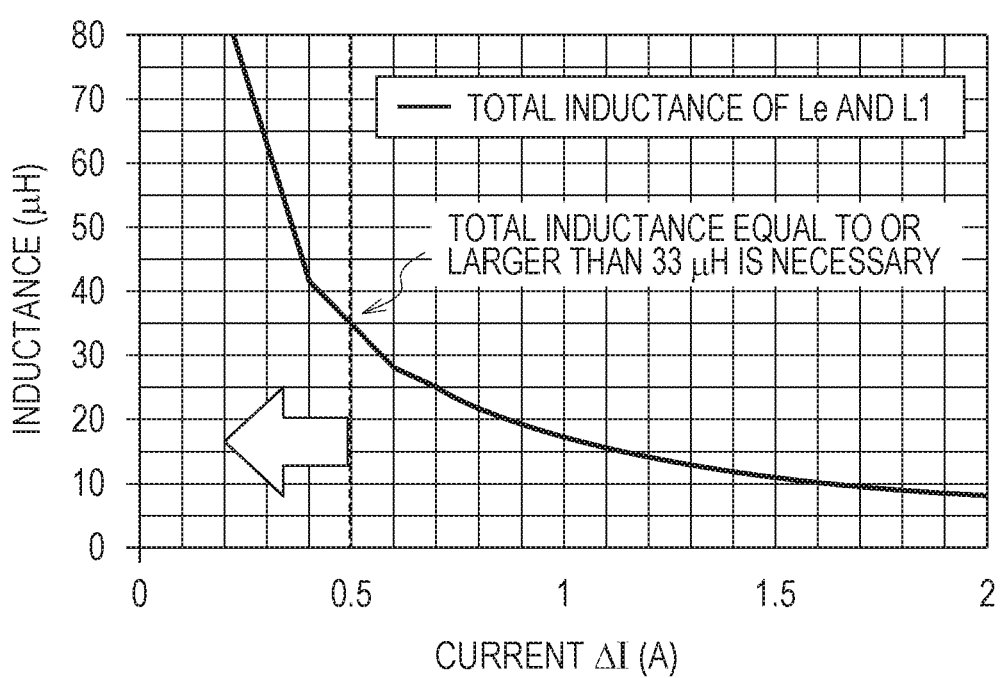
FIG. 15 illustrates a relationship between the total inductance of Le1 and L1 and a current flowing through the transformer primary winding coil according to the first embodiment.

FIG. 15 illustrates a relationship between the total inductance of the inductance Le1 and the inductance L1 and the current flowing through the transformer primary winding coil according to the first embodiment. A horizontal axis represents the current on the primary side of the transformer, and a vertical axis represents the total inductance. When the input voltage on the input side is Vin, the voltage ON-time is Ton, the driving frequency is fd, and the current is I, then the total inductance can be calculation according to the following equation.

[Math. 2]

$$Le + L1 = \frac{Vin \times Ton}{I} \quad \text{(Eq. 1-3)}$$

Here the calculation was performed assuming that Vin is 3 V, Ton is 5.6 µs, the frequency is 90 kHz, and the driving pulse width is 50%. The total inductance and the current are inverse to each other, and thus, to reduce the current, it is necessary to increase the total inductance. On the other hand, the current has an upper limit to prevent the transformer from having magnetic saturation. In view of the above, the maximum current flowing through the transformer according to the present embodiment is 0.5 A. Therefore, from FIG. 15, the total inductance needs to be equal to or greater than 33 µH. If the inductance is increased more than necessary, the result is an increase in a wiring resistance of the winding coil, which results in an increase in power consumption. Thus the total inductance was set to 40 µH so as to be larger than 33 µH with a margin. Vin, Ton, and I may change depending on the power supply and the transformer, and thus the total inductance may be adjusted according to the equation described above.

FIG. 4 illustrates plots of a calculation result for various values of Ka in a range from 0.1 to 10. A horizontal axis represents a frequency. (a) represents the circuit power consumption, and (b) represents the alternating voltage Vo on the output side. The total inductance of the coil 102 and the transformer primary winding coil 104, i.e., Le1+L1 was set to 40 µH for the above-described reason, and the value of Ka was changed. For example, when Ka=1, Le1 and L1 were set such that Le1=20 µH and L1=20 µH. First, the circuit power consumption shown in FIG. 4(a) has two peaks. A lower-frequency peak is located close to 88 kHz. This means that a large current flows through the piezoelectric element at frequencies close to the mechanical resonance frequency. As for a higher-frequency peak, its peak frequency changes in a range from 135 to 240 kHz, which indicates that the electric resonance frequency changes depending on the value of Ka. This means that it is possible to adjust the electric resonance characteristic of the circuit by adjusting Ka, and it is possible to reduce the third harmonic by shifting the electric resonance frequency to a lower frequency. When the driving frequency is 100 kHz, from FIG. 4(a) and FIG. 4(b), the power consumption of the circuit and the driving voltage vary depending on the value of Ka. That is, by optimizing Ka, it is possible to configure the circuit such that a sufficiently high alternating voltage is output from the circuit while reducing the power consumption of the circuit. The electric resonance frequency fe and the alternating voltage characteristic which are to be considered in optimizing Ka are summarized below.

Figure 18:
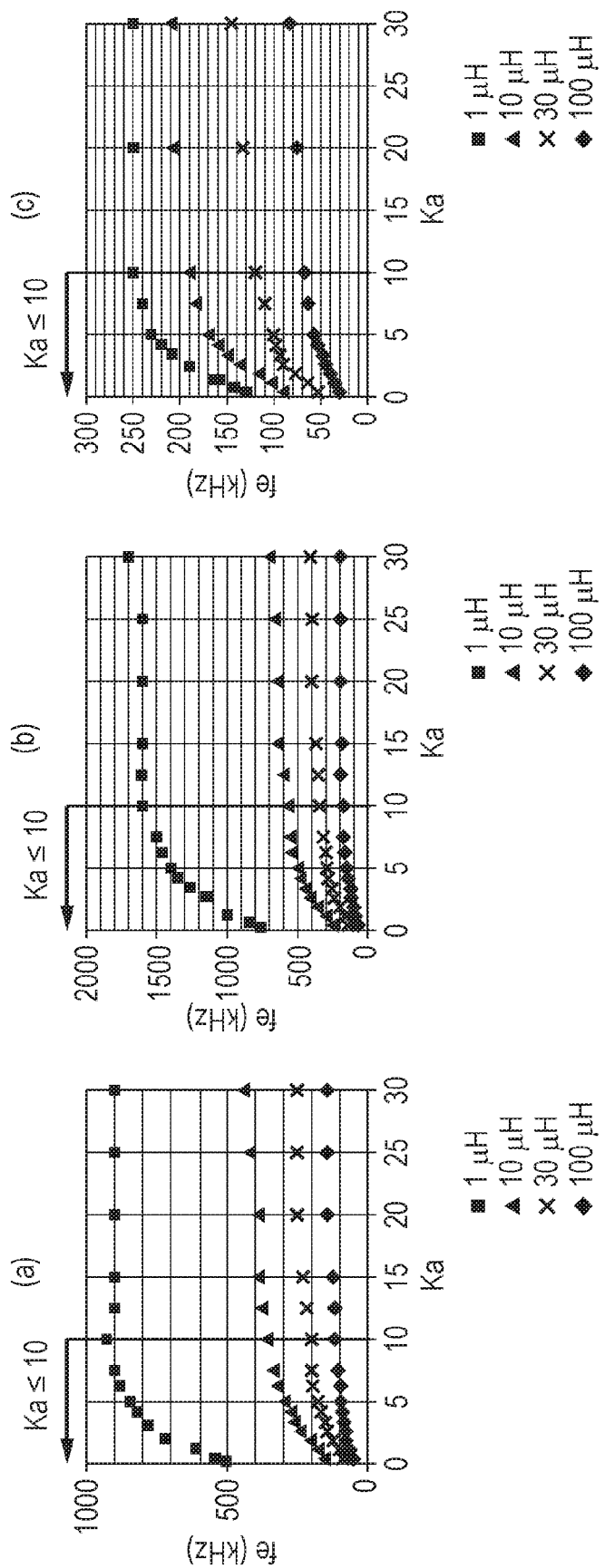
FIG. 18 shows a result of a calculation of an electric resonance frequency fe depending on Ka according to the first embodiment of the present invention.

FIG. 18 shows a result of a calculation of the electric resonance frequency fe as a function of Ka according to the present embodiment. It is possible to adjust fe in the lower frequency range by changing Ka, and thus it is possible to reduce third harmonic for a reason described later, which results in an increase in circuit efficiency. Herein a comparison was made among different values, 1 µH, 10 µH, 30 µH, and 100 µH, of the inductance L1 of the transformer primary winding coil 104. 1 µH can be regarded as a minimum value that can be realized for the winding coil of the transformer.

FIG. 18(a) shows a result for a case where the turn ratio is 16, Cd is 0.47 nF, and Ka is changed in a range from 0.2 to 30. As can be seen from the figure, the electric resonance frequency fe has small values when Ka≤10. Therefore, it is possible to effectively shift fe to a lower frequency by setting Ka such that Ka≤10. That is, it is possible to reduce the ratio of the third harmonic to the first harmonic. This tendency holds for various values of L1. FIG. 18(b) shows a result for a case where the turn ratio is 10 and Cd is 0.47 nF, and FIG. 18(c) shows a result for a case where the turn ratio is 10 and Cd is 3.5 nF. The results described above indicate that if Ka≤10, it is possible to adjust fe in the low frequency range with a low inductance for various different values of the turn ratio of the transformer and various values of intrinsic capacitance of the piezoelectric element.

In the present embodiment, to make it possible to achieve a small ratio of the third harmonic to the first harmonic by adjusting fe in a lower frequency range, it has been derived that the value of Ka is to be in a proper range shown below:

$$Ka \leq 10 \quad \text{(Eq. 1-4)}$$

When Ka has a proper value, it is possible to reduce the circuit power consumption of the vibration-type actuator.

In the oscillator, for example, the resonance frequency or the capacitance of the piezoelectric element varies depending on the structure or the size of the vibrating element, the vibration mode of the oscillator, or the like, and thus it is necessary to change circuit constants for each oscillator. Even for the same vibrating element, in a case where a plurality of vibrating elements are driven, if the same driving circuit is shared, the capacitance increases with the number of vibrating elements, and thus the electric resonance characteristic of the circuit becomes different from that in the case where only one vibrating element is driven. When a driving circuit for a plurality of vibrating elements is designed, there are many design parameters such as inductance value of each element in the driving circuit. In a case where a specified driving voltage is simply output, there are an infinite number of possible combinations of values. A particular combination of circuit constants is determined mainly by a decision of a designer, and power consumption or controllability in driving the oscillator greatly depends on the determined circuit constants.

The driving circuit according to the present invention provides a high circuit efficiency and reduced circuit power consumption regardless of the structure or the size of the vibrating element, the vibration mode, and the number of vibrating elements.

Conventionally, no systematic method is known as to determination of constants of a driving circuit using a step-up transformer so as to solve the problems described above. In contrast, the driving circuit according to the present invention is, for example, a transformer step-up circuit that can be designed in terms of the relationship between coils and transformer constants, and the number of vibrating elements and the inductance values of the transformer so as to satisfy Ka≤10 thereby making it is possible to design the driving circuit to have a high circuit efficiency.

As described above, when the current flowing though the coil on the primary side of the transformer is greater than a maximum allowable input current value Imax, the transformer goes into a magnetic saturation state and thus it becomes impossible to properly perform voltage stepping-up. In the designing, the possible values of the input voltage Vin and the voltage ON-time Ton on the primary side depend on the power supply connected to the input side, the frequency or the amplitude of the alternating voltage required to drive the vibrating element under the desired conditions, and thus the degree of the freedom of the design is not large. As represented by (Eq. 1-3), the input current value I is determined by the input voltage Vin and the voltage ON-time Ton on the primary side and the total inductance value of the inductance Le1 and the inductance L1. Therefore, by setting the total inductance value of the inductance Le1 and the inductance L1 so as to satisfy (Eq. 1-5) described below, it becomes possible to prevent the input current from being larger than the maximum allowable input current value Imax, and thus it becomes possible to achieve a stable stepping-up of the input voltage.

[Math. 3]

$$Le1 + L1 \geq \frac{Vin \times Ton}{Imax} \quad \text{(Eq. 1-5)}$$

Furthermore, as described above, by setting the value of the ratio of the inductance Le1 to the inductance L1 so as to satisfy (Eq. 1-4), it is possible to effectively shift fe to a lower frequency, that is, it is possible to reduce the ratio of the third harmonic to the first harmonic. Therefore, by setting Ka within the proper range according to (Eq. 1-4) and setting the total inductance to the value calculated according to (Eq. 1-5), it is possible to realize the vibrating-element driving circuit such that the transformer does not have magnetic saturation, the circuit constants are selected so as to allow the winding coil to have smaller resistance, and the circuit efficiency is improved.

Figure 19:
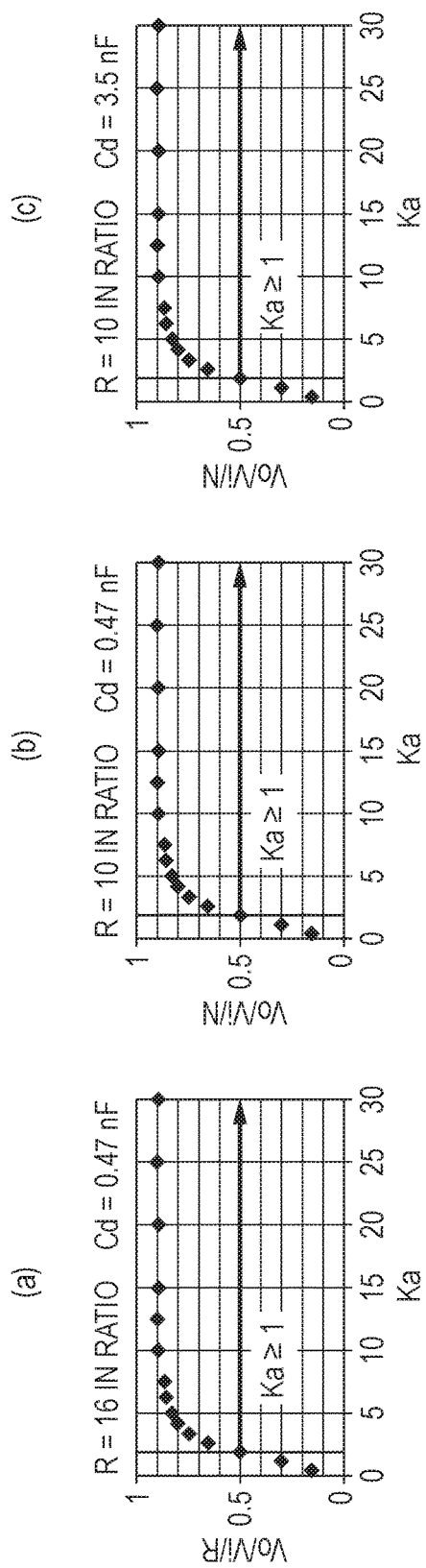
FIG. 19 illustrates a result of a calculation of a voltage ratio depending on Ka according to the first embodiment of the present invention.

FIG. 19 illustrates a result of a calculation of a voltage ratio depending on Ka according to an embodiment of the present invention. In FIG. 19, the voltage ratio is normalized as Vo/Vin/R, that is, the ratio of the output voltage to the input voltage is divided by the turn ratio. By evaluating the voltage ratio divided by the turn ratio R, it is possible to describe the effects of the present invention without depending on the value of the input voltage and the value of the turn ratio. As for the inductance L1 of the transformer primary winding coil 104, the calculation was performed for different values of 1 µH, 10 µH, 30 µH, and 100 µH as in FIG. 18.

However, no difference depending on the value was observed in the result, and thus the result of the calculation is plotted only for 30 μH. Ideally, the voltage ratio is 1. However, a reduction to a certain degree is unavoidable because of a trade-off against the effect of adjusting fe to a lower frequency. Therefore, if the adjustment of fe in a lower frequency range is taken account, it is preferable to make a configuration such that the voltage ratio is equal to or larger than 0.5.

FIG. 19(a) shows a result for a case where the turn ratio is 16 and Cd is 0.47 nF and Ka is changed in a range from 0.2 to 30. As can be seen from the figure, the voltage ratio is equal to or greater than 0.5 if Ka≥1. FIG. 19(b) shows a result for a case where the turn ratio is 10 and Cd is 0.47 nF, and FIG. 19(c) shows a result for a case where the turn ratio is 10 and Cd is 3.5 nF. As can be seen from the above results, there is a similar tendency in terms of the relationship between the voltage ratio and Ka regardless of the turn ratio of the transformer or the intrinsic capacitance of the piezoelectric element, and it is possible to obtain a voltage equal to or greater than one-half the transformer turn ratio (a voltage ratio equal to or greater than 0.5) if Ka≥1.

In the present embodiment, in addition to the range shown in (Eq. 1-4), it has been derived that the driving voltage equal to or greater than one-half the turn ratio can be obtained by setting the value of Ka so as to satisfy the following:

$$1 \leq Ka \qquad \text{(Eq. 1-6)}.$$

Therefore, if the value of Ka satisfies 1≤Ka≤10, it is possible to reduce the circuit power consumption of the vibration-type actuator and obtain a proper driving voltage. Furthermore, it becomes possible to design a transformer so as to have further smaller inductance, and thus it is possible to design a circuit element so as to be capable of being easily produced. The external size of the transformer and that of the coil depend on the turn ratio and inductance value thereof, and thus, to reduce the circuit installation area, it is necessary to reduce the value of the turn ratio or the inductance. Furthermore, it is possible to reduce a high-frequency current, and thus it is also possible to reduce magnetic noise from the transformer.

Figure 5:
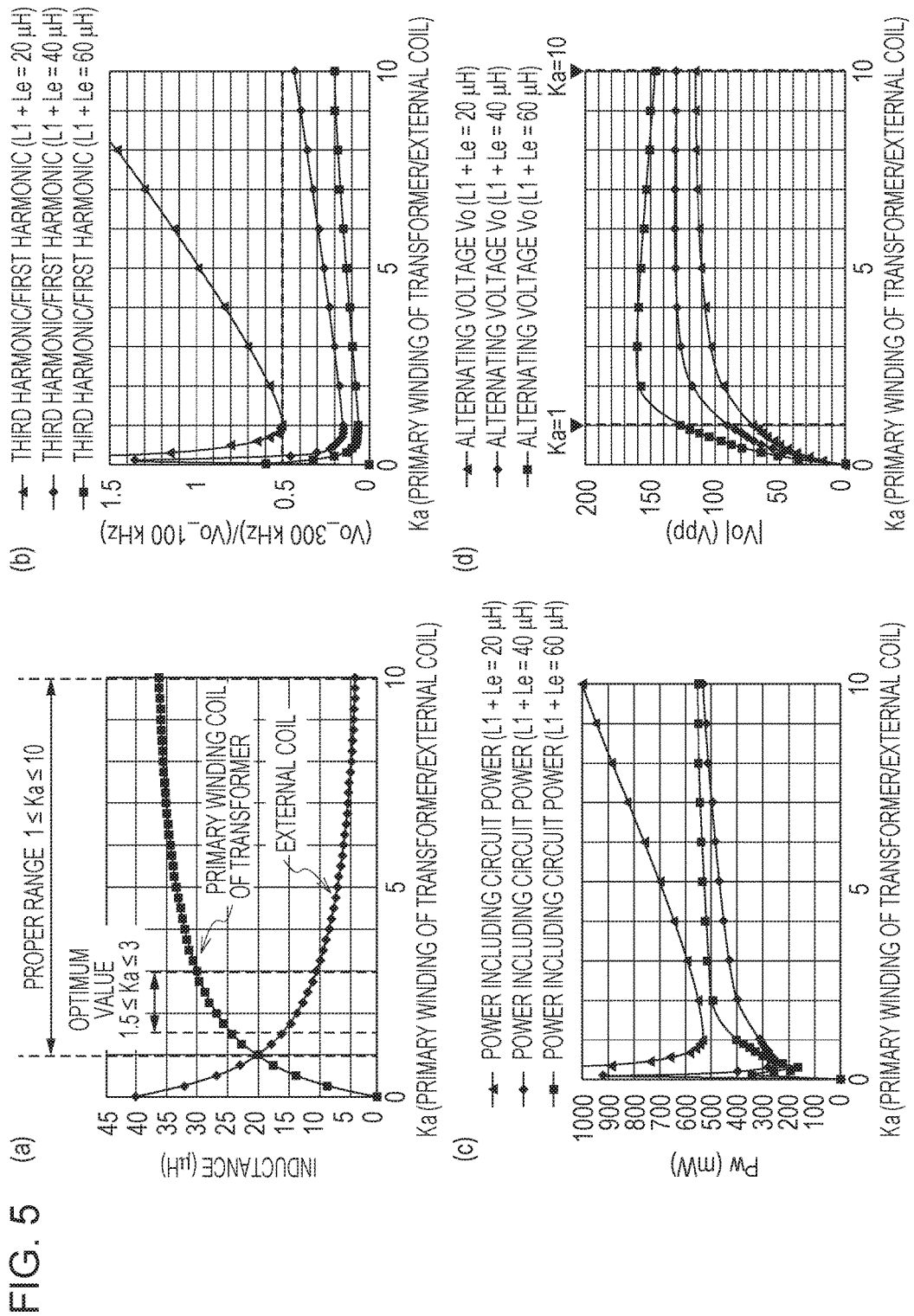
FIG. 5 is a diagram illustrating a relationship between the inductance of a coil and the inductance of a transformer primary winding coil depending on Ka, and a result of a calculation of an alternating voltage and power consumption at 100 kHz according to an embodiment of the present invention.

In the above-described calculation of Ka, a result in a proper range obtained generally for a wide variety of conditions has been described. Next, specific examples are described below with reference to figures for a case where conditions in terms of the turn ratio, the intrinsic capacitance, the driving frequency, or the like are fixed. FIG. 5 is a diagram illustrating a relationship between the inductance of the coil and the inductance of the transformer primary winding coil depending on Ka, and a result of a calculation of an alternating voltage and power consumption at 100 kHz according to an embodiment of the present invention. FIG. 5(a) illustrates a relationship between inductance values (Le1, L1) of the coil 102 and the transformer primary winding coil 104 depending on Ka. The total value of Le1 and L1 is 40 μH, and Ka is changed from 1 to 10. Circuits were experimentally produced according to the calculation result and the produced circuits were evaluated. The result showed that the circuit power consumption was minimized in a range of Ka=1.5 to 3.0. Therefore, a more preferable range of Ka is 1.5≤Ka≤3.0 from the point of the view of the relationship between the inductance values (Le1, L1) of the coil 102 and the transformer primary winding coil 104.

FIG. 5(b) shows a result of the voltage ratio of third harmonic to first harmonic depending on Ka, where the numerator is the third harmonic and the denominator is the first harmonic. The driving frequency is 100 kHz, and thus the voltage of the third harmonic has a frequency of 300 kHz, which is three times higher than 100 kHz. The alternating voltage Vi input to the primary side of the transformer is in the form of a rectangular wave as described above. Among harmonic components included in the rectangular wave, a greatest one is a third harmonic, and next and third ones are firth harmonic, seventh harmonic, and so on. That is, when the relative magnitude of the third harmonic is large, the resultant rectangular wave is a sine wave with large waveform distortion, which causes an unwanted current to flow, which in turn results in a reduction in efficiency or results in an occurrence of magnetic noise. As Ka increases, the electric resonance frequency fe of the circuit shifts to a higher frequency and thus the relative magnitude of the third harmonic increases. From FIG. 5(b), when the value of Ka satisfies Ka≤5, the voltage of the first harmonic is greater than the voltage of the third harmonic for any of the value Le1+L1 of 20 μH, 40 μH, and 60 μH. Therefore, to reduce the influence of harmonic components, it is preferable that Ka satisfies Ka≤5.

Furthermore, a high circuit efficiency can be obtained when the ratio of the voltage of the third harmonic to the voltage of the first harmonic is equal to or smaller than 0.5. Therefore, a graph shown in FIG. 5(b) may be produced, and the inductance L1 of the primary winding coil may be determined from the graph. That is, when the voltage amplitude of the first harmonic of the driving frequency is V1 and the voltage amplitude of the third harmonic is V3, it is preferable to set the inductance values of the primary winding coil 104 and the coil 102 such that the ratio, V3/V1, of the third harmonic to the alternating voltage is equal to or smaller than 0.5.

FIG. 5(c) shows a result of circuit power consumption depending on Ka. Herein the circuit power consumption refers to power of the whole driving circuit including the piezoelectric element. As shown in the figure, when the total value of Le1 and L1 is 20 μH, as Ka increases, the power consumption increases. This is because an increase in the third harmonic results in an increase in current, which results in an increase in power consumed by a wiring resistance of the winding coil. In a case where the total value of Le1 and L1 is 60 μH, when Ka=3, the driving voltage is 160 Vpp from FIG. 5(d) and power consumption is 500 mW from FIG. 5(c). In contrast, in a case where the total value is 40 μH, the driving voltage is 125 Vpp and power consumption is as small as 400 mW. That is, in the case where the total value is 60 μH, the driving voltage is large, but the large driving voltage tends to cause the increase in power consumption. From the point of view of the magnetic saturation of the transformer described above, the total value of Le1 and L1 may be set to 60 μH. In the case where the total value is set to 40 μH, it is possible to further reduce the power consumption. A reduction in inductance makes it possible to use a small-size transformer, which makes it possible to reduce the installation area of the circuit.

To achieve a sufficient voltage step-up effect and a reduction in harmonic component, it is desirable that the electric resonance frequency fe and the mechanical resonance frequency fm of the vibrating element satisfy (Eq. 1-7) described below.

$$1.30 \cdot fm < fe < 2.50 \cdot fm \qquad \text{(Eq. 1-7)}$$

This makes it possible to obtain a value equal to or smaller than 1.0 for the voltage ratio of the third harmonic to the first harmonic. To reduce the influence of harmonic components such as the third harmonic, the capacitance Cd of the piezoelectric element and the turn ratio of the transformer may be adjusted in addition to the adjustment described above. However, the adjustment of Cd results in an increase in the input current, and thus an increase in power consumption occurs. In the case where the turn ratio is adjusted, it is necessary to change the input voltage of the driving circuit, which imposes a restriction on the power supply used, and thus it is difficult to adjust the turn ratio. Thus, it is possible to achieve a sufficient voltage step-up effect by setting the value of the electric resonance frequency fe and the value of the mechanical resonance frequency fm of the vibrating element so as to satisfy (Eq. 1-7) described above, thereby reducing the harmonic components. That is, when the vibrating-element driving circuit is designed, if the sum of Le1 and L1 and the ratio, Ka, thereof are determined so as to satisfy (Eq. 1-7), it is possible to achieve a sufficient voltage step-up effect and a reduction in harmonic components.

A specific example is described below. FIG. 5(d) shows a result of the alternating voltage Vo depending on Ka. The result is plotted for respective cases where the total value of Le1 and L1 is 20 μH, 40 μH, and 60 μH. In any case, the alternating voltage Vo abruptly increases in a range of Ka=0 to 1. When Le1+L1 is 20 μH or 40 μH, the voltage gradually increases in a range of Ka=1 to 5, and substantially no change in voltage occurs in the range of Ka=5 to 10. When Le1+L1 is 60 μH, the voltage gradually increases and then slightly decreases in the range of Ka=1 to 5, and substantially no change occurs in voltage in the range of Ka=5 to 10. This means that a sufficient voltage step-up effect is obtained for Ka≥1, and the voltage step-up effect is saturated for Ka≥5. Therefore, the voltage step-up effect is obtained in an effective manner for the case where Ka satisfies Ka≤5. Thus, to achieve the voltage step-up effect effectively, it is preferable to set the value of Ka so as to satisfy Ka≤5. In the vibration-type actuator according to the present embodiment, a sufficient controllability can be achieved by ensuring that the alternating voltage is equal to or greater than 90 Vpp and more preferably the alternating voltage is 120 Vpp.

Next, a range of electric resonance frequency fe is explained. In FIG. 4 described above, fe is 135 to 180 kHz (which is 1.53 to 2.05 times larger than fm) in a range of 1≤Ka≤10 when the total value of Le1 and L1 is 40 μH.

Figure 6:
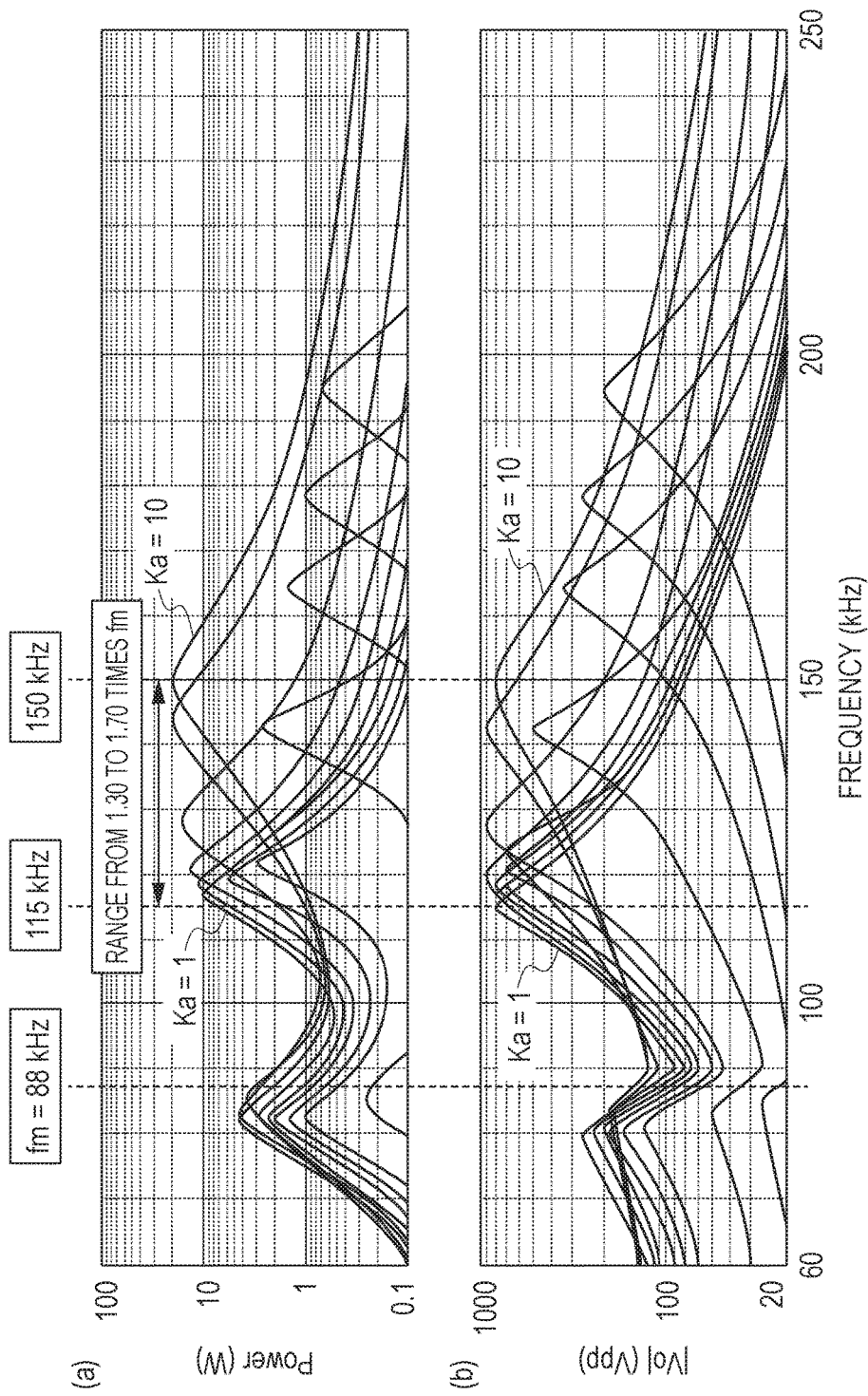
FIG. 6 is a diagram illustrating a result of a calculation of power and an output voltage of a driving circuit according to an embodiment of the present invention.

FIG. 6 is a diagram illustrating a result of the circuit power consumption and the alternating voltage Vo for the case where the total value of Le1 and L1 is 60 μH. FIG. 6(a) shows the circuit power consumption, while FIG. 6(b) shows the alternating voltage Vo on the output side. As shown in FIG. 5(b), among the three values of 20 μH, 40 μH, and 60 μH of the total value of Le1 and L1, 60 μH allows it to achieve the smallest voltage ratio of the third harmonic to the first harmonic. Therefore, in a case where the reduction in third harmonic is of the most significant priority, it may be allowed to employ the case where the total value of Le1 and L1 is 60 μH. From plotting in the range of Ka=1 to 10, the electric resonance frequency fe falls in a range of 115 to 150 kHz (which is 1.30 to 1.70 times higher than fm).

Figure 21:
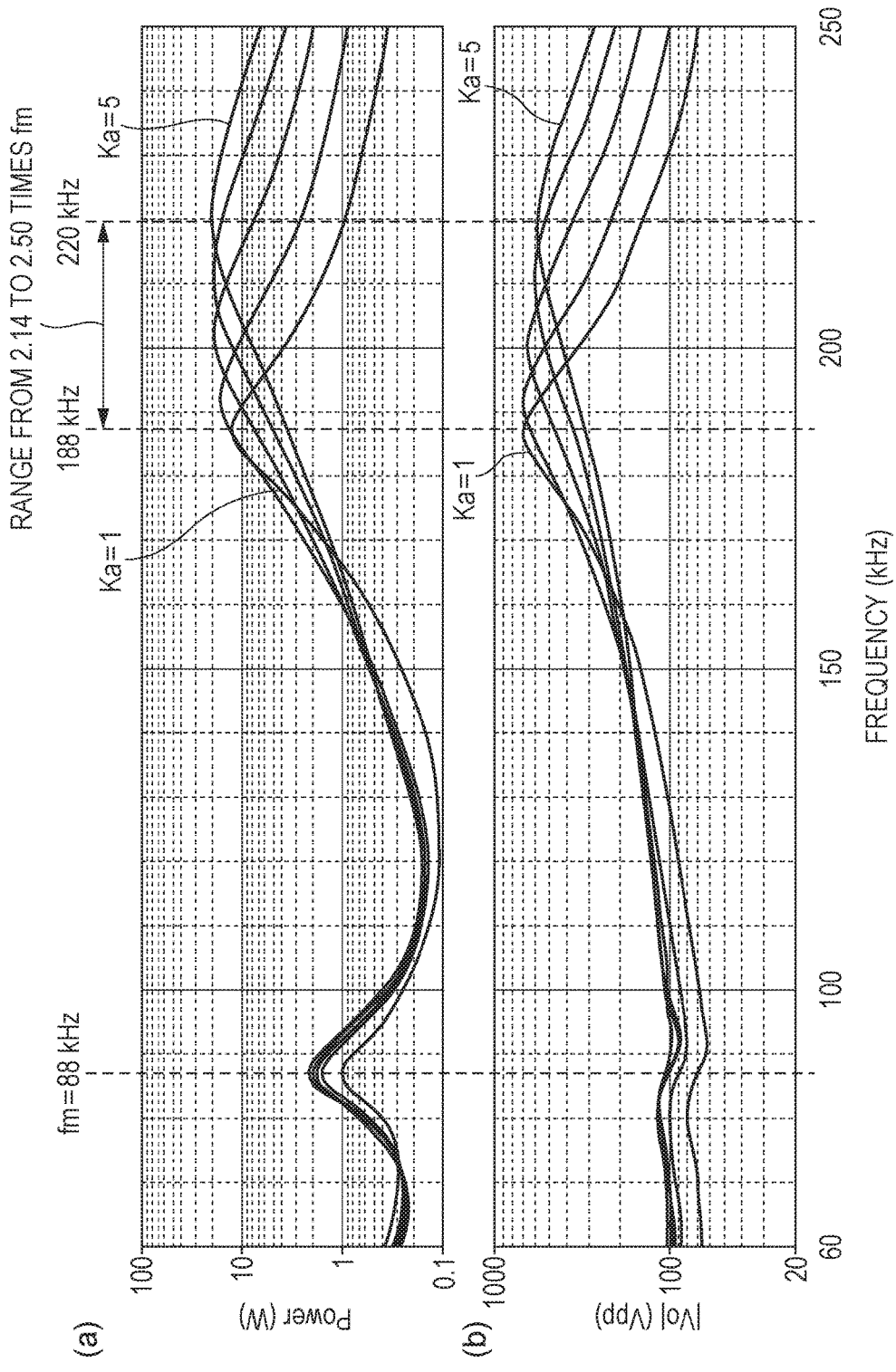
FIG. 21 is a diagram illustrating a result of a calculation of power and an output voltage of a driving circuit according to an embodiment of the present invention.

FIG. 21 is diagram illustrating a result of a calculation of the circuit power consumption and the alternating voltage Vo for the case where the total value of Le1 and L1 is 20 μH. FIG. 21(a) shows the circuit power consumption, while FIG. 21(b) shows the alternating voltage Vo on the output side. From FIG. 5(b), in the case where the total value of Le1 and L1 is 20 μH, if plotting is performed for a range of Ka=1 to 5 in which the voltage ratio of the third harmonic to the first harmonic is equal to or smaller than 1.0, then the electric resonance frequency fe falls in a range of 188 to 220 kHz (which is 2.14 to 2.50 times higher than fm).

The electric resonance frequency fe is involved with both series electric resonance of Le1 and capacitance Cd and parallel electric resonance of L1 and capacitance Cd, and, as the inductance decreases, the response period becomes shorter and the resonance frequency increases. Therefore, when other conditions are fixed, the electric resonance frequency fe increases as the total value of Le1 and L1 decreases.

Therefore, to reduce the influence of the harmonic component other than the first harmonic used in the driving and excite the vibration mode practically suitable for the vibrating element, the proper range of fe represented by equation (1-7) described above may be employed for the case where the total value of Le1 and L1 is in the range from 20 μH to 60 μH.

Thus in the present driving circuit, when let fe denote the peak frequency of the electric resonance caused by the combination of the inductor, the transformer, and the capacitance of the electro-mechanical energy conversion element, fm denote the resonance frequency of the vibrating element including the electro-mechanical energy conversion element, let Le1 denote the inductance of the inductor, and let L1 denote the inductance of the primary winding coil of the transformer, and Ka is defined as Ka=L1/Le1, if the driving circuit is designed such that at least the values described above satisfy 1.30·fm<fe<2.50·fm and Ka≤10, then the influence of harmonic components is reduced and the power consumption of the circuit is reduced. Thus it is possible to realize the driving circuit with improved circuit efficiency in which an unwanted current flowing in the driving circuit or in the vibration-type actuator is suppressed, and it is also possible to realize the high-efficiency vibration-type actuator.

Figure 7:
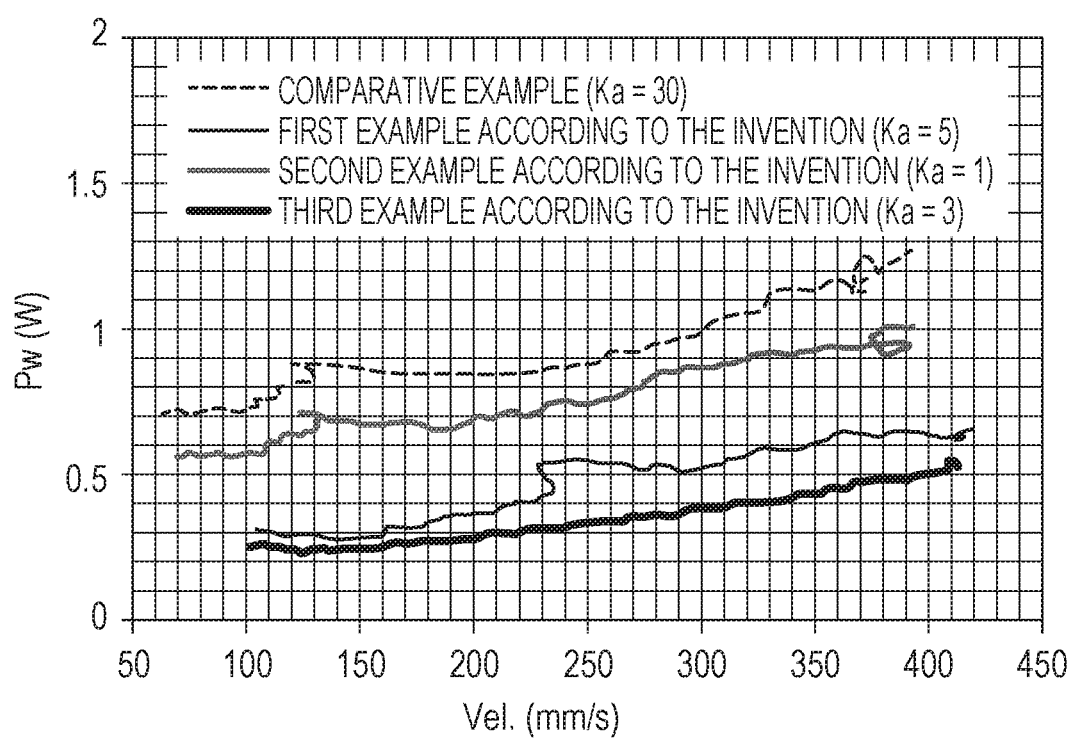
FIG. 7 is a diagram illustrating an experimental result of power consumption of a whole driving circuit according to the present invention.

FIG. 7 is a diagram illustrating an experimental result in terms of the power consumption of the whole driving circuit according to the present embodiment. A horizontal axis represents the speed, and a vertical axis represents power consumption when the oscillator is driven. A comparative example is also plotted to show an effect of a reduction in power consumption achieved by the present invention. Hereinafter, it is assumed that a coil serving as the inductor 102 has an inductance of Le1, the transformer primary winding coil has an inductance of L1, and the transformer primary winding coil 104 has an inductance of L2. In the comparative example, a circuit includes a transformer with L1=30 μH, L2=12 mH, and a turn ratio of 20, and a coil with Le1=1 μH. In this comparative example, Ka=30. In a first example according to the present invention, a circuit includes a transformer with L1=30 μH, L2=12 mH, and a turn ratio of 20 and a coil with Le1=5.6 μH. In this first example, Ka=5.3. In a second example according to the present invention, a circuit includes a transformer with L1=6.25 μH, L2=2.5 mH, and a turn ratio of 20 and a coil with Le1=5.6 μH. In this second example, Ka=1.1. In a third example according to the present invention, a circuit includes a transformer with L1=30 μH, L2=7.68 mH, and a turn ratio of 16 and a coil with Le1=10 μH. In this third example, Ka=3. In any case, the power supply voltage was adjusted in a range from 2.75 V to 3.5 such that the circuit outputs a driving voltage of about 120 Vpp. In the comparative example, although a sufficiently high voltage is achieved, the high value of Ka causes large harmonic components, which results in a reduction in efficiency. In contrast, in the examples according to the present invention, values of power consumption are about 1.0 W or smaller, and in any example, suppression in harmonic components and a reduction in power consumption are achieved in comparison with the comparative example. In the third example according to the present invention, a further reduction in the ratio of harmonic component is achieved compared with the first example, and thus a further reduction in power consumption is achieved. Furthermore, in the third example according to the present invention, the reduction in driving voltage is suppressed more effectively compared with the second example, and thus it is possible to reduce the power supplied from a power supply to obtain a necessary driving force, which results in a reduction in power consumption. Thus, a highest efficiency is obtained in the third example according to the present invention.

Figure 11:
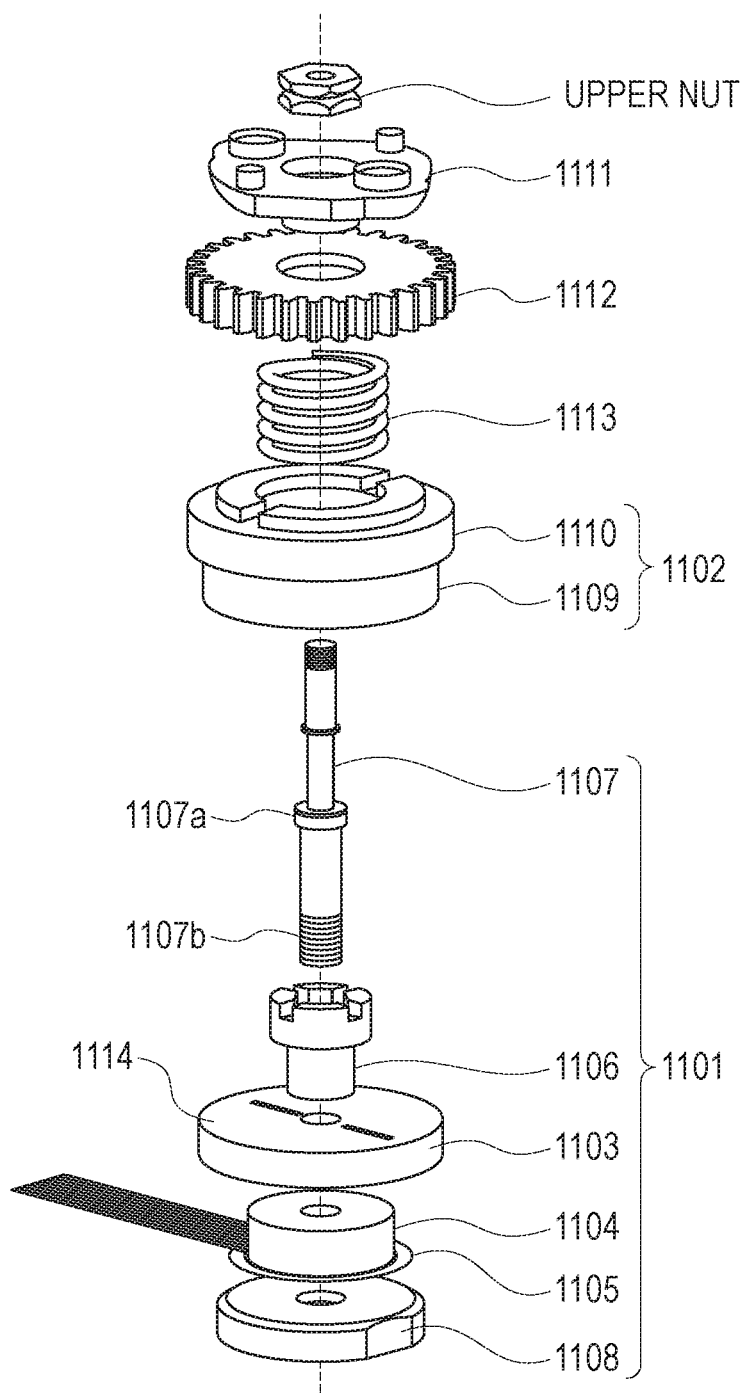

The vibrating-element driving circuit according to the present invention may be used to drive a lens or move an image sensor element in an image pickup apparatus. It is also possible to apply it to other vibration-type actuators. FIG. 11 is an exploded perspective view of a rod-shape oscillator usable to perform zoom driving or autofocus driving of a camera lens. The oscillator includes a vibrating element 1101 and a moving element 1102. The vibrating element 1101 includes a first elastic element 1103 including a friction part made of a friction material, a piezoelectric element 1104 which is an electro-mechanical energy conversion element, a flexible printed wiring board 1105 for supplying power to the piezoelectric element 1104, and two elastic elements 1106. These elements are pressure-connected between a butt flange 1107a of a shaft 1107 and a lower nut 1108 engaged with a thread part 1107b located on a lower side of the shaft 1107. The first elastic element 1103 is made of sintered ceramic including primarily, for example, alumina such that upper and lower surfaces are double-disk ground and then the upper surface serving as a friction surface is finish-polished. The moving element 1102 includes a contact spring 1109 and a rotor 1110. The contact spring 1109 is fixed to the rotor 1110, for example, by bonding. Thus the moving element 1102 is urged into pressure contact with the friction surface 1114 of the vibrating element 1101 by a pressure spring 1113 and an output gear 1112 rotatably supported by a bearing of the flange 1111. The contact spring 1109 of the moving element 1102 is formed in the shape of a circular cylinder having a crank cross section made by drawing stainless steel, and a lower end surface serving as a friction surface of the moving element is in contact with the friction surface 1114 of the first elastic element of the vibrating element. An alternating signal is applied to the piezoelectric element 1104 from a not-shown power supply via the flexible printed wiring board 1105. As a result, a first-order bending vibration is excited, in two perpendicular directions, in the friction surface of the first elastic element 1103, and superimposition thereof with a time phase of π/2 causes an elliptic rotation movement to occur in the friction surface 1114. As a result, the contact spring 1109 in pressure contact with the friction surface is relatively moved with respect to the vibrating element 1101.

The driving circuit according to the present invention shown in FIG. 1(a) was applied to the rod-shaped oscillator described above. The mechanical resonance frequency fm of the vibrating element 1101 is 42 kHz, and the intrinsic capacitance Cd is 9 nF. The power supply voltage was set to 5V and the transformer turn ratio is set to 8, and designing was performed such that a driving voltage with a necessary value in a range of 70 to 110 Vpp was obtained over a driving frequency range 42.5 to 44 kHz. Hereafter, the inductance of the coil is denoted by Le1, the inductance of the transformer primary winding coil is denoted by L1, and the inductance of the transformer primary winding coil is denoted by L2. According to the present invention, a driving circuit was experimentally produced using a transformer with L1=27 µH and L2=1.73 mH and a coil with Le1=15 µH. In this case, Ka=1.8. For the purpose of comparison, a circuit was investigated which included a transformer with a turn ratio of 10, L1=8 µH, and L2=800 µH and a coil with Le1=22 µH where Ka was set such that Ka=0.36 and a power supply voltage was to 6V. Although no figure is provided, in the circuit according to the present invention, an increase in the driving voltage by a factor of 1.3 was achieved, and a reduction in the power consumption by a factor of 0.5 was achieved. As described above, the driving circuit according to the present embodiment can be applied to a vibration-type actuator having a different resonance frequency fm of the piezoelectric element or a different intrinsic capacitance Cd.

Figure 14:
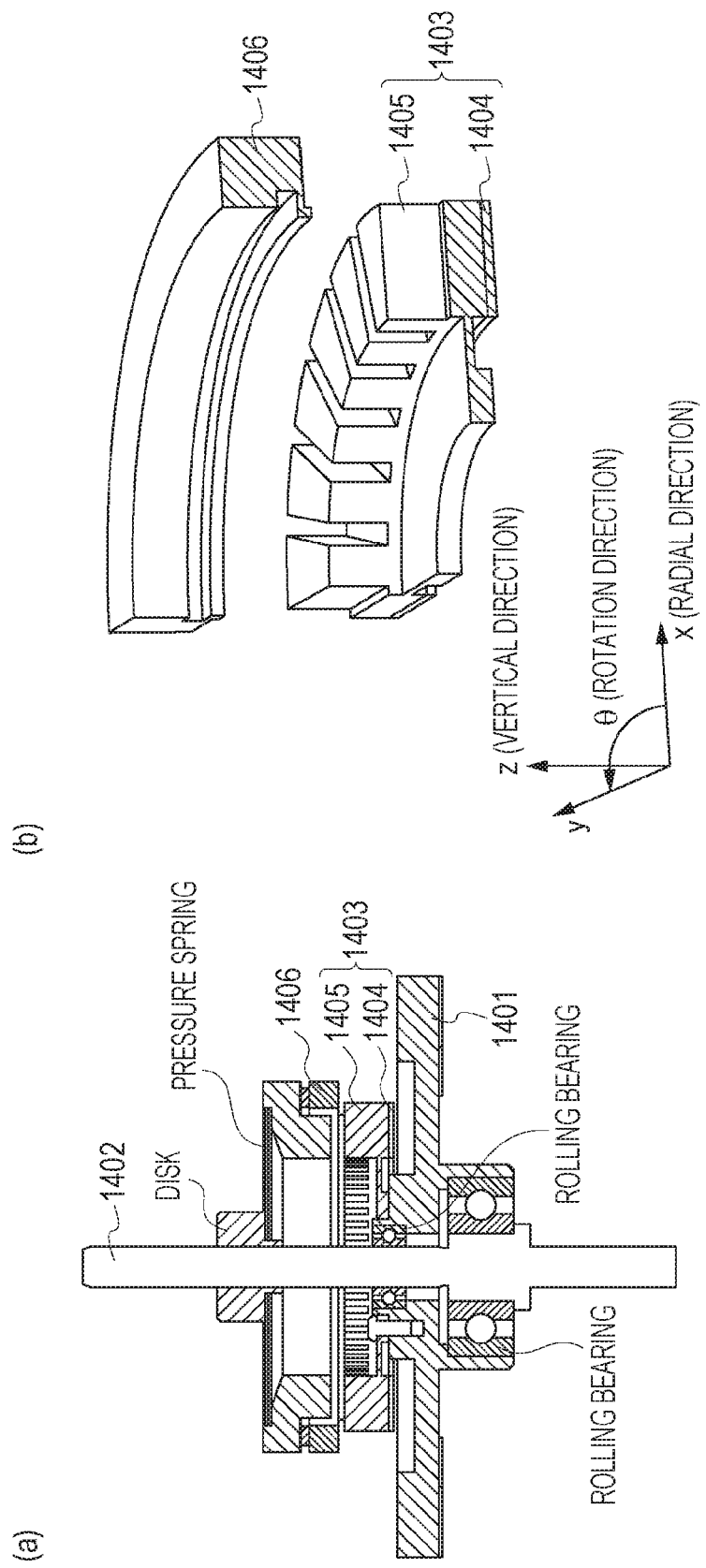
FIG. 14 is a schematic diagram illustrating a structure of a travelling-wave vibration-type actuator.

The vibrating-element driving circuit according to the present invention may also be applied, for example, to a ring-shaped vibrating element used to drive a transfer drum to rotate in an image generation apparatus. FIG. 14 is a schematic diagram illustrating a structure of a travelling-wave-type oscillator. First, an outline of the oscillator according to the present embodiment is described.

FIG. 14(a) is a schematic diagram showing a cross-section of the travelling-wave-type oscillator. The oscillator is connected to a common-user housing 1401 via one output axis 1402. By applying a two-phase alternating voltage output from a not-shown driving circuit to driving electrodes disposed on the piezoelectric element 1404 of the vibrating element 1403, the moving element 1406 is driven so as to rotate in the same direction. FIG. 14(b) is a perspective view partially illustrating the oscillator. The oscillator includes a piezoelectric element 1404 which is an electro-mechanical energy conversion element, a vibrating element 1403 including an elastic element 1405, and a moving element 1406. Each element has a ring shape extending in a θ-direction in the figure. When the two-phase alternating voltage is applied to the piezoelectric element 1404, a travelling wave is generated in the vibrating element 1403, and the moving element 1406 in contact with the vibrating element 1403 is friction-driven so as to rotate relative to the vibrating element.

The driving circuit according to the present invention shown in FIG. 1(a) was applied to the travelling-wave-type oscillator described above. The mechanical resonance frequency fm of the vibrating element 1403 is 44 kHz, and the intrinsic capacitance Cd is 3.5 nF. The power supply voltage was set to 24 V and the transformer turn ratio was set to 10 and designing was performed such that a driving voltage of 500 Vpp was obtained over a driving frequency range of 45 to 50 kHz. Hereafter, the inductance of the coil is denoted by Le1, the transformer primary winding coil has an inductance of L1, and the inductance of the transformer primary winding coil is denoted by L2. According to the present invention, the circuit was experimentally produced using a transformer with L1=15 µH and L2=1.50 mH and a coil with Le1=10 µH. Ka was set such that Ka=1.5. As a result, a desired driving voltage, a high circuit efficiency, and a good driving performance were achieved. This was achieved because it was possible to suppress an unwanted current by adjusting the electric resonance frequency in the low frequency range using a low-inductance transformer and a low-inductance coil thereby generating a sine driving waveform having small harmonic distortion. As described above, the driving circuit can be applied also to travelling-wave-type vibration-type actuators.

Applications of the vibrating-element driving circuit according to the present invention are not limited to the examples described above, but it can also be applied, for example, to a case where the vibrating element is a dust removal apparatus, that is, the driving circuit can also be used as a driving circuit of the dust removal apparatus.

Second Embodiment

Next, a description is given below as to an example of a circuit configuration in which a coil is disposed on the secondary side of a transformer. FIG. 16 illustrates a configuration of a driving circuit according to a second embodiment. An inductor 1601 serving as the coil is provided on the secondary side of the transformer. The inductance thereof is denoted by Le2, the inductance of the secondary winding coil of the transformer is denoted by L2, and the inductance ratio thereof is defined by Kb.

$$Kb=L2/Le2 \quad \text{(Eq. 2-1)}$$

In the present embodiment, various constants such as an input voltage Vi on the primary side of the transformer, a turn ratio and an upper limit of a current of the transformer used, a mechanical resonance frequency of a vibrating element, and a necessary driving voltage are the same in value as those according to the first embodiment. First, from the upper limit of the current flowing on the primary side of the transformer, the inductance L1 of the transformer primary winding coil is set to 40 µH. Thus, if the turn ratio of the transformer is R, the inductance value L2 of the transformer secondary winding coil is determined as 10.24 mH according to the following equation.

$$L2=L1 \times R^2 \quad \text{(Eq. 2-2)}$$

Figure 17:
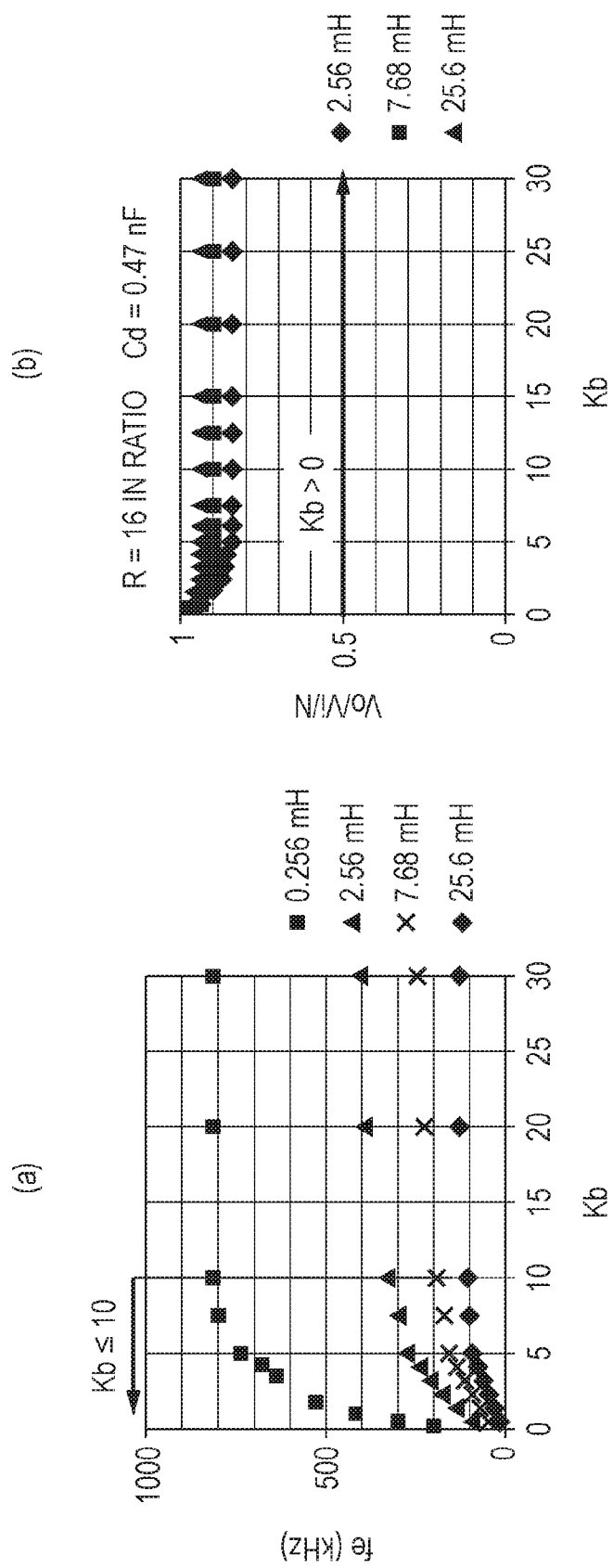
FIG. 17 shows a result of a calculation of an electric resonance frequency fe and a voltage ratio for various values of Kb in a range of 0.2 to 30 according to the second embodiment.

FIG. 17 shows a result of a calculation of the electric resonance frequency fe and the voltage ratio depending on Kb according to the embodiment of the present invention. It is possible to adjust fe in a low-frequency range depending on Kb, as with Ka, and thus it is possible to reduce the third harmonic, and an improvement in the circuit efficiency can be achieved. Herein a comparison was made among values of 0.256 mH, 2.56 mH, 7.68 mH, and 25.6 mH of the transformer secondary winding coil 105. The turn ratio was set to 16, and thus when the transformer secondary winding coil 105 is 0.256 mH, the transformer primary winding coil is 1 µH, which is a minimum realizable value.

FIG. 17(a) shows a result of a calculation of fe for a case where Kb is changed from 0.2 to 30 under the condition that the turn ratio is 16 and Cd is 0.47 nF. As shown in the figure, it is possible to effectively shift fe to a lower frequency by setting Kb such that Kb≤10. That is, it is possible to reduce the ratio of the third harmonic to the first harmonic. This tendency was also observed for various different values of L2. If Kb≤10, as with Ka, it is possible to adjust fe in a low frequency range even if the turn ratio of the transformer and/or the intrinsic capacitance of the piezoelectric element are changed.

In the present embodiment, to set the value of Kb within a proper range in which the ratio of the third harmonic to the first harmonic can be reduced by adjusting fe in the flow frequency range, it is desirable that Kb satisfies the following condition (Eq. 2-3).

$$Kb \leq 10 \quad \text{(Eq. 2-3)}$$

By setting the value of Kb so as to satisfy (Eq. 2-3) described above, it is possible to effectively reduce the circuit power consumption of the vibration-type actuator.

Figure 12:
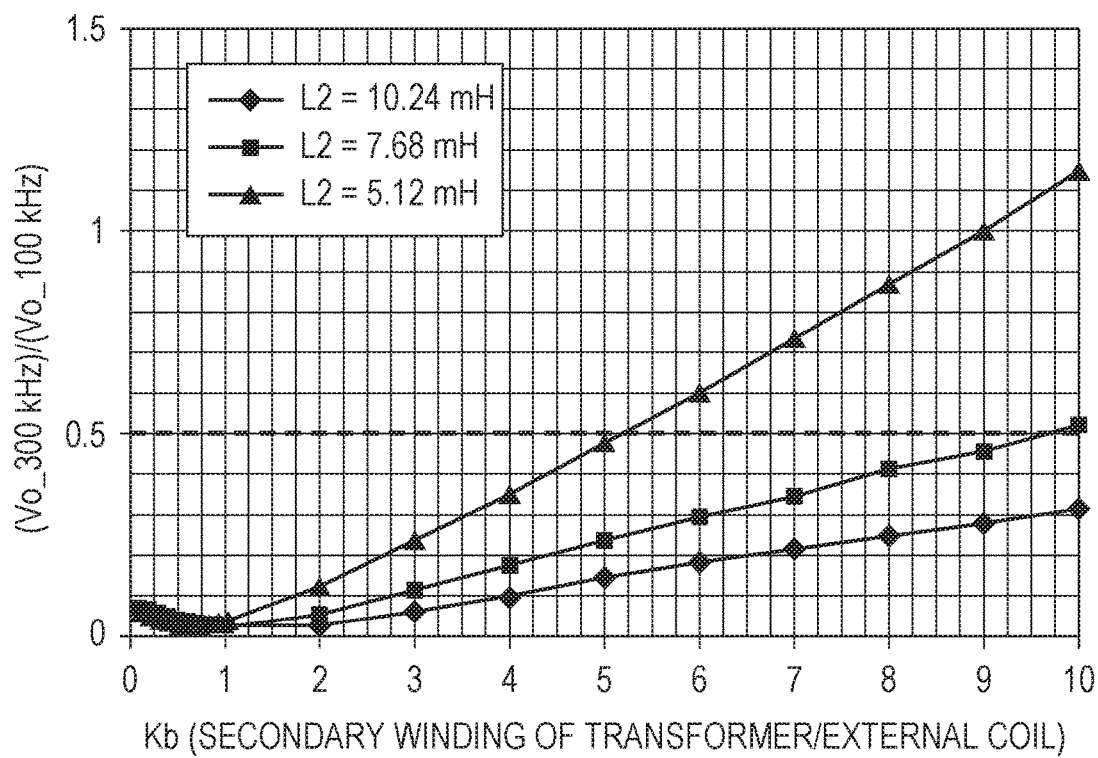
FIG. 12 shows a result of a calculation the ratio of the voltage amplitude of third harmonic to that of the first harmonic depending on Kb according to a second embodiment.

FIG. 17b shows a result of a calculation of the voltage ratio depending on Kb. The voltage ratio is normalized as Vo/Vin/R, that is, the input/output voltage ratio is divided by the turn ratio. As shown in the figure, the voltage ratio is equal to or greater than 0.5 over the entire range of Kb. That is, the output voltage is hardly influenced by the inductance Le2 of the inductor disposed on the secondary side of the transformer. In contrast, an influence occurs in the case of Ka. The reason for this is that there is a difference in the voltage supplied to the transformer primary winding coil 104. In the case of Ka, the input voltage is divided between the coil 102 and the primary winding coil 104, and thus a larger value of Le1 results in a smaller voltage supplied to the primary winding coil 104. On the other hand, in the case of Kb, the input voltage is entirely supplied to the primary winding coil 104 without being divided and stepped up. FIG. 12 shows the ratio of the voltage amplitude of third harmonic to that of the first harmonic depending on Kb. Herein an explanation is given for a case where L2 is 5.12 mH, 7.68 mH, and 10.24 mH. In the ratio, the numerator is the third harmonic and the denominator is the first harmonic. The driving frequency is 100 kHz, and thus the voltage of the third harmonic has a frequency of 300 kHz, which is 3 times higher 100 kHz. The alternating voltage Vi input to the primary side of the transformer has a rectangular wave as described above. The rectangular wave includes harmonic components, and a third harmonic is greatest in magnitude among all. As Kb increases, the inductance Le2 of the coil 1601 decreases and the relative magnitude of the third harmonic increases. The ratio of the third harmonic can be equal to or smaller than 0.5 when the following conditions are satisfied: the value of Kb satisfies Kb about 5 when L2=5.12 mH; and the value of Kb satisfies Kb about 10 when L2=10.24 mH.

Figure 13:
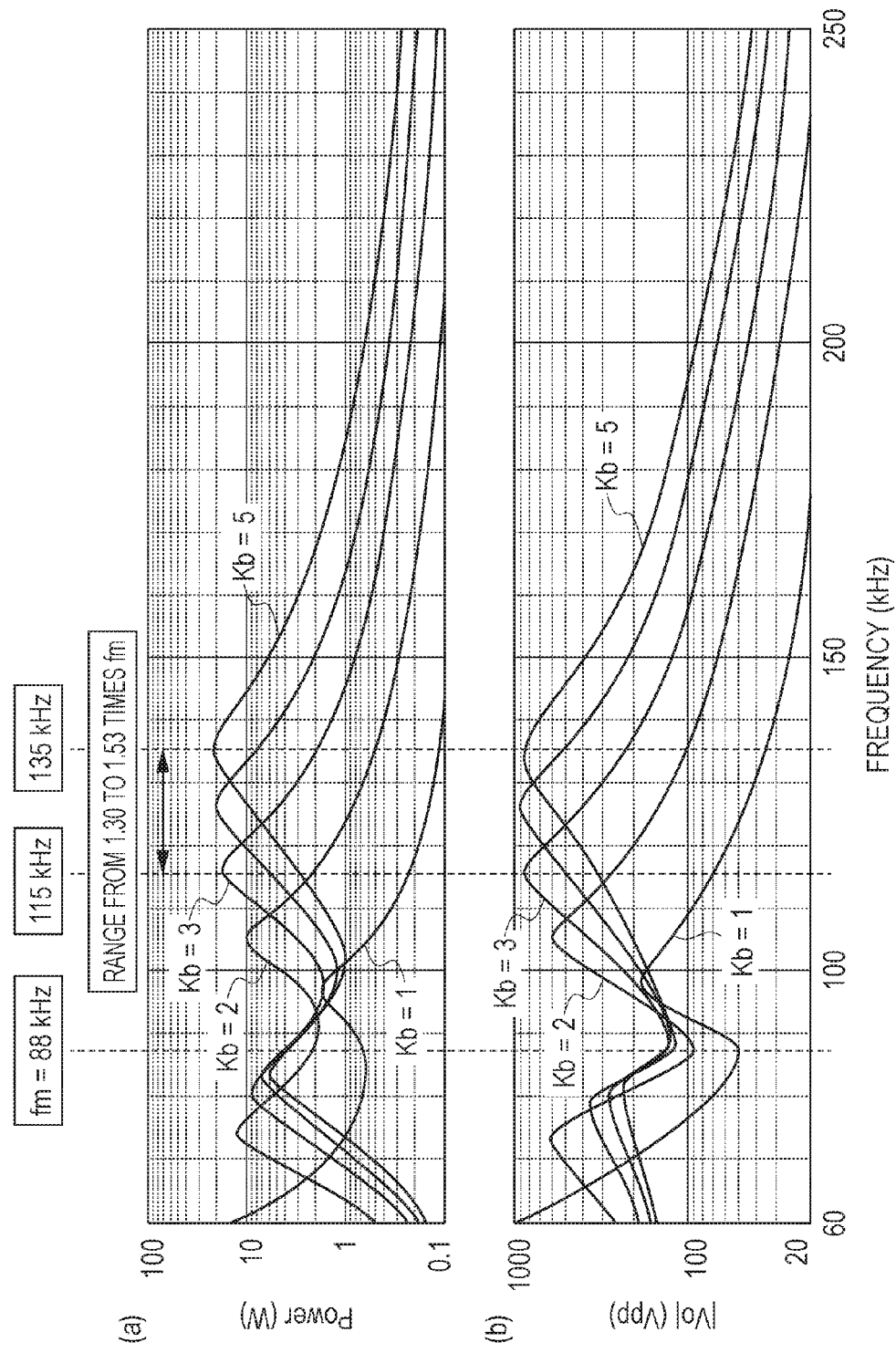
FIG. 13 is a diagram illustrating a result of a calculation of power and an output voltage of a driving circuit according to the second embodiment.

FIG. 13 is a diagram showing a result of a calculation of the circuit power consumption and the alternating voltage Vo according to the second embodiment. The calculation was performed under the condition that the constants of the transformer were set such that L1 was 40 µH and L2 was 10.24 mH and Kb was taken in a range of 1≤Kb≤5. The inductance Le2 of the coil 1601 disposed on the secondary side of the transformer was set to 2.05 mH for Kb=5 and 10.24 mH for Kb=1. A horizontal axis represents a frequency. FIG. 13(a) shows power consumed by the whole circuit, and FIG. 13(b) shows an alternating voltage Vo on the output side. From FIG. 13(b), it can be seen that as Kb increases, the electric resonance frequency fe of the circuit shifts toward a higher frequency range. In a range of Kb≤10, as can be seen from FIG. 12 described above, a greatest reduction in the third harmonic is achieved in a range of Kb=1 to 2 and a greatest driving voltage is obtained. The electric resonance frequency fe is close to 100 kHz which is the upper limit of the driving frequency, and thus, in a case where the value of Kb is set in a range of Kb=1 to 2, a resistor maybe disposed on the primary side or the secondary side of the transformer such that a peak voltage decreases thereby preventing an excess voltage from being applied to the vibrating element. In a range of Kb=3 to 5, the electric resonance frequency fe is 115 to 135 kHz (which is 1.30 to 1.53 times higher than fm). In this case, from the result shown in FIG. 12 described above, the ratio of the third harmonic to the first harmonic is as small as 0.07 to 0.15, and thus the influence of third harmonic is small and the power consumption is small. From the result shown in FIG. 17 described above, a necessary driving voltage is obtained. Thus in the case of the vibration-type actuator according to the present embodiment, it is preferable to use it in the range of Kb=3 to 5.

Third Embodiment

Figure 8:
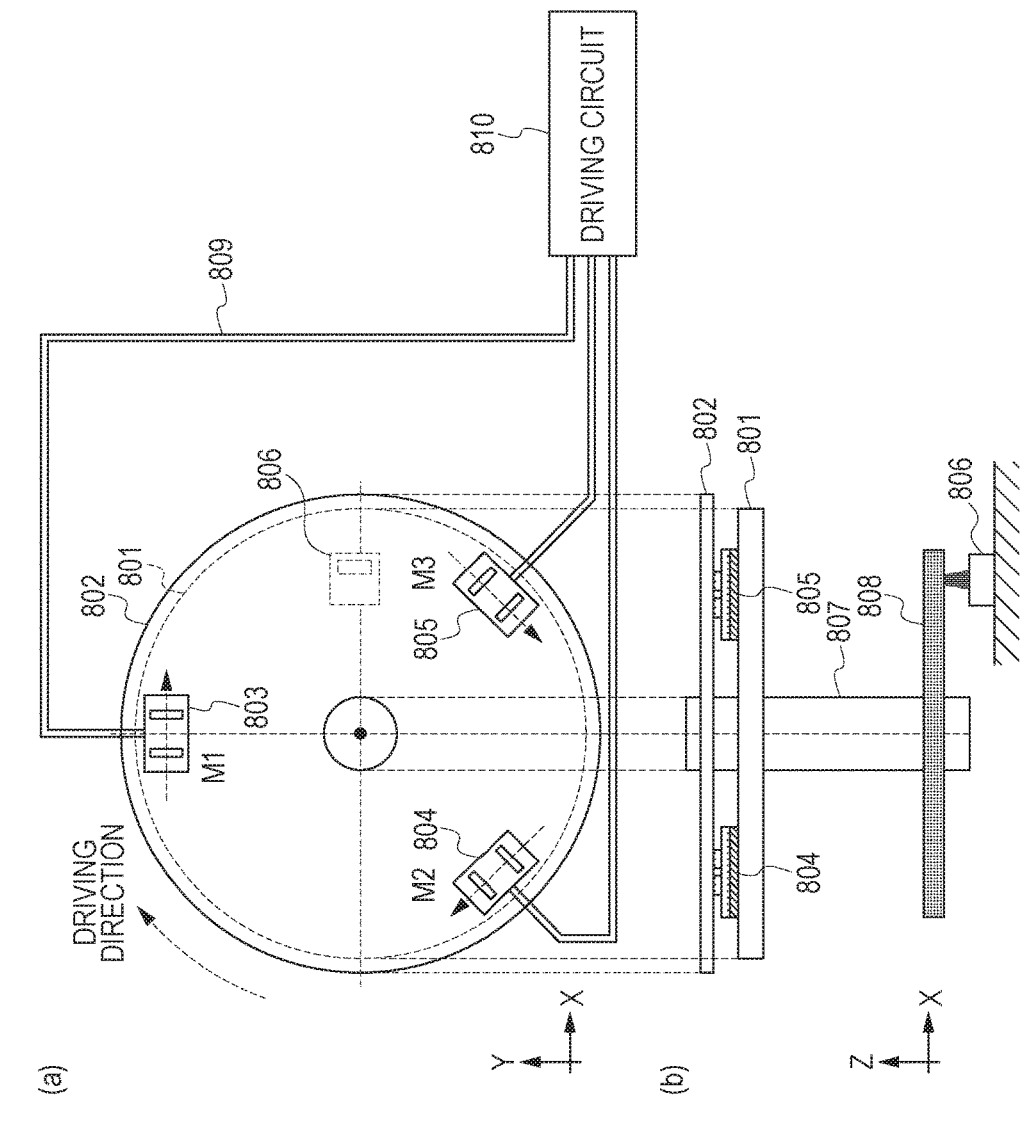
FIG. 8 illustrates an example of a vibration-type actuator including a plurality of vibrating elements and a driving circuit therefor according to an embodiment of the present invention.

FIG. 8 illustrates an example of a vibration-type actuator including a plurality of vibrating elements according to an embodiment of the present invention. In this embodiment, driving is performed by a driving circuit to which three vibrating elements are connected in parallel to a secondary side of a transformer. FIG. 8(a) is a diagram illustrating a configuration of the vibration-type actuator using three vibrating elements according to the present embodiment. 801 denotes a base plate serving as a base of the vibration-type actuator. 803, 804, and 805 denote vibrating elements that drive a moving element 802 to rotate. Each vibrating element is similar to the vibrating element according to the first embodiment. Output terminals of the driving circuit are connected in parallel to the three vibrating elements, and two-phase driving signals are supplied to the respective vibrating elements via flexible cables 809. The three vibrating elements are driven by a common driving circuit 810. When a driving voltage is applied, a vibration wave occurs in each vibrating element and thus a driving force is generated. The moving element 802 is driven by a resultant force of the driving forces given by the vibrating elements 803, 804, and 805 such that the moving element 802 rotates about a rotation axis 807. By using three vibrating elements as in the present embodiment, the resultant rotation drive force is exerted on the moving element 802, and thus it becomes possible to increase the torque by a factor of up to 3. 806 denotes a position sensor which detects a rotational position of the moving element 802.

FIG. 8(b) is a side view of the apparatus. The vibrating elements 803, 804, and 805 are combined together, for example, by bonding vibrating members each having two extrusions to piezoelectric elements (not shown) and attached to a base plate 801 via an attachment member. A disk-shaped scale 808 is disposed on the upper surface of the position sensor 806. In response to movement of the scale 808 in the rotation direction, a position signal depending on the moving distance is output from the position sensor 806.

FIG. 9 is a diagram illustrating a driving circuit associated with one phase of vibrating element, in the vibration-type actuator including a plurality of vibrating element according to the present embodiment. The driving circuit is configured such that an inductor 904 is connected in series to a transformer primary winding coil 906, and the vibrating elements 901, 902, and 903 are connected in parallel to a secondary winding coil 907 of a transformer 905. As for the inductor 904, an inductance element such as a coil may be used. In FIG. 9(a), the inductor 904 is connected to an upper side of the transformer primary winding coil 906. Instead, the inductor 905 may be connected to a lower side to achieve an equivalent circuit configuration. Herein, the turn ratio of a transformer secondary winding coil 907 to the primary winding coil 906 was set to 20.

Now, an equivalent circuit of the vibrating element 901 is described with reference to FIG. 9(b). FIG. 9(b) represents, in the form of an equivalent circuit, a one-phase part of the vibrating element 901. The equivalent circuit of the vibrating element 901 includes an RLC series circuit corresponding to a mechanical vibrating part and a capacitor 908 having an intrinsic capacitance Cd of the vibrating element 901 and connected in parallel with the RLC series circuit. The RLC series circuit corresponding to the mechanical vibrating part can be represented using an equivalent coil 909 with a self-inductance Lm, an equivalent capacitor 910 with a capacitance Cm, and an equivalent resistor 911 with a resistance value Rm, where Lm is 50 mH, Cm is 65 pF, Rm is 3 kΩ, and Cd is 0.54 nF. The vibrating elements 902 and 903 each can be represented by a similar equivalent circuit. Thus, the total intrinsic capacitance of the three vibrating elements is 1.62 nF which is three times larger.

In a case where a plurality of vibrating elements are connected in parallel to a secondary winding of a transformer such that the transformer is shared in driving the plurality of vibrating elements as in the case of the present embodiment, electrical matching can be achieved by setting the inductances of the transformer as follows. Herein, let R denote the turn ratio of the transformer in the case where N vibrating elements are driven by a common driving circuit, Ln1 denote the transformer primary winding coil, Ln2 denote the inductance of the secondary winding coil, and Len1 denote the coil on the primary side. When L1 is the inductance of the primary winding coil of the transformer shown in FIG. 1(a) in the driving circuit according to the first embodiment, then the values of the above parameters may be set as follows.

$Ln2 = L1 \cdot R^2/N$ $Ln1 = L1/N$ $Len1 = Ln1/Ka$ (Eq. 3-1)

The reason for this is as follows. When a plurality of vibrating elements are connected in parallel, the intrinsic capacitance of the vibrating elements becomes N times greater and the impedance becomes 1/N, and thus a N times greater current flows. To obtain an impedance equivalent to this for the transformer secondary winding coil, the inductance may be set to be 1/N such that N times larger current can flow. For example, in the case where one vibrating element is driven as illustrated above with reference to FIG. 3, the inductance L2 (=L1·R²) of the secondary winding coil 105 of the transformer was 7.68 mH. In this case N=3, and thus the value of Ln2 needed to achieve matching can be calculated as 2.56 mH. In the present embodiment, Ln2 is set to 2.50 mH. Therefore, circuit parameters may be set as follows. When the turn ratio Rn is 20, the inductance Ln1 of the transformer primary winding coil may be 6.25 µH, and thus if Ka is set such that Ka=3, the coil Len1 may be 2.08 µH. By determining the inductance of the transformer winding coils in the above-described manner, it is possible to set the inductance to have a necessary and sufficient value. That is, it is not necessary to set the inductance to be greater than is necessary. As a result, it is possible to reduce the wire wound resistor of the transformer.

Also in a driving circuit in which a coil is disposed on the secondary side of a transformer, in a case where a plurality of vibrating elements are connected in parallel and driven in parallel, parameters may be determined as follows. Let R denote the turn ratio of the transformer in the case where N vibrating elements are driven by a common driving circuit, Ln1 denote the transformer primary winding coil, Ln2 denote the inductance of the secondary winding coil, and Len1 denote the coil on the secondary side. When L2 is the inductance of the secondary winding coil of the transformer shown in FIG. 16 in the driving circuit according to the second embodiment, then the values of the above parameters may be set as follows.

$Ln2 = L2/N$ $Ln1 = L2/N/R^2$ $Len2 = Ln2/Kb$ (Eq. 3-2)

Figure 10:
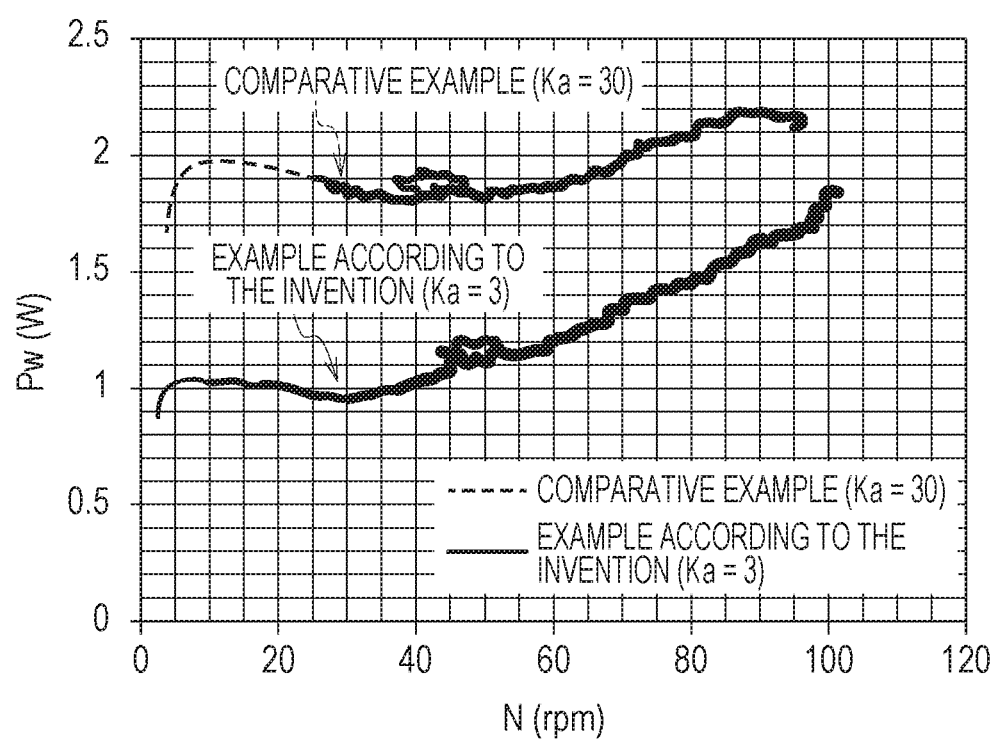
FIG. 10 is a diagram illustrating an experimental result of power consumption of a whole driving circuit according to an embodiment.

FIG. 10 is a diagram illustrating an experimental result in terms of the power consumption of the whole driving circuit according to the present embodiment. A horizontal axis represents a speed when an ultrasonic motor is driven, and a vertical axis represents power consumption. A comparative example is also plotted to show an effect of a reduction in power consumption achieved by the present invention. Hereinafter, let Len1 denote the inductance of the coil serving as the inductor 904, L1 denote the inductance of the transformer primary winding coil 906, and Ln2 denote the inductance of the transformer secondary winding coil 907. The comparative example is a circuit including a transformer with Ln1=30 μH, Ln2=7.68 mH, and a turn ratio of 16, and a coil with Len1=1 μH, where Ka=30. The example according to the present invention is a circuit including a transformer with L1=6.25 μH, L2=2.5 mH, and a turn ratio of 20, and a coil with Len1=2.08 μH, where Ka=3.0. In each case, the power supply voltage is adjusted in a range from 3.0 V to 3.5 such that the circuit outputs a driving voltage of about 120 Vpp. In the comparative example, the winding coils of the transformer have large inductance and thus have large resistor, and the circuit efficiency is bad. That is, matching is not achieved. If Ka of the comparative example is reduced, the electric resonance frequency fe becomes close to the mechanical resonance frequency fm, and thus an excessive voltage is applied. In the case where the winding coil of the transformer has large resistance, the voltage division ratio causes a reduction in the driving voltage applied to the vibrating element. As a result, it is necessary to increase the power supply voltage to 3.5 V, which also causes a reduction in efficiency. In the example according to the present invention, a sufficiently high driving voltage is achieved and harmonic components are suppressed by setting Ka to an optimum value, and furthermore, the inductance of the transformer is matched with the plurality of vibrating elements, and thus it is possible to reduce the wire wound resistor and it is possible to realize a high-efficiency driving circuit.

Fourth Embodiment

In a fourth embodiment, an image pickup apparatus is described as an example of an apparatus including a vibrating-element driving circuit according to one of the embodiments described above. FIG. 20(a) is a perspective view which is partially transparent and schematically illustrates a structure of a digital camera 400 which is an example of an image pickup apparatus.

A lens barrel 410 is attached to a front surface of the digital camera 400. In the inside of the lens barrel 410, a plurality of lenses (not shown) including a focus lens 407 and an image stabilization optical system 403 are disposed. The image stabilization optical system 403 is capable of vibrating in an up/down direction (Y-direction) and a right/left direction (X-direction) by receiving rotations of biaxial coreless motors 404 and 405.

In a main body of the digital camera 400, a microcomputer (MPU) 409 that generally controls an operation of the digital camera 400, and an image sensor element 408 are disposed. The image sensor element 408 is a photoelectric conversion device such as a CMOS sensor, a CCD sensor, or the like, and the image sensor element 408 converts an optical image formed by light passing through the lens barrel 410 into an analog electric signal. To this end, the image sensor element 408 is disposed on an optical axis of the focus lens 407. The analog electric signal output from the image sensor element 408 is converted to a digital signal by a not-shown analog-to-digital converter, and then is subjected to particular image processing performed by a not-shown image processing circuit, and finally is stored as image data (video data) in a storage medium such as a not-shown semiconductor memory or the like.

The digital camera 400 includes, in its main body, internal apparatuses including a gyroscope sensor 401 that detects an amount of camera shake (vibration) in an up/down direction (pitching) and a gyroscope sensor 402 that detects an amount of camera shake (vibration) in a right/left direction (yawing). Coreless motors 404 and 405 are driven in directions opposite to the directions of vibrations detected by the gyroscope sensors 401 and 402 such that the optical axis of the image stabilization optical system 403 is vibrated. As a result, the vibration of the optical axis caused by the camera shake is cancelled out, and thus it is possible to correct camera shake and obtain a captured image having high image quality.

The vibrating element is used as a driving unit 300 that drives a focus lens 407 disposed in the lens barrel 410 in the optical axis direction via a not-shown gear train. However, use of the vibrating element is not limited to the above example, but the vibrating element can be used to drive an arbitrary lens such as a zoom lens (not shown) or drive the image sensor element during the image stabilization process instead of using the coreless motors 404 and 405.

The vibrating-element driving circuit according to one of embodiments described above may be applied to an industrial robot.

FIG. 20(b) is a perspective view schematically illustrating a structure of a robot 100 in which a vibration-type driving apparatus is installed. Herein, a horizontal articulated robot, which is one type of industrial robot, is shown as an example. A vibrating element is installed in an arm joint unit 111 or a hand unit 112 in the robot 100. The arm joint unit 111 connects two arms 120 such that it is allowed to change an angle between the two arms 120. The hand unit 112 includes an arm 120, a gripping unit 121 attached to one end of the arm 120, and a hand joint unit 122 that connects the arm 120 and the gripping unit 121. The vibrating element is used in the arm joint unit 111 that changes the angle between the arms 120 or in the hand joint unit 122 that rotates the gripping unit 121 by a particular angle.

The vibrating-element driving circuit according to one of the embodiments described above may be applied to other apparatuses such as an image forming apparatus or the dust removal apparatus described above. In the case where it is applied to the image forming apparatus it may be used, for example, to drive a rotating drum. In the case where the vibrating-element driving circuit is used in the dust removal apparatus, the vibrating element may be disposed on a substrate, and the substrate may be vibrated by driving the vibrating element with the driving circuit to remove dust from the substrate. The dust removal apparatus may be disposed, for example, on an optical axis of a lens of the image pickup apparatus.

By applying the driving apparatus for driving the vibrating element according to one of embodiments described above, it is possible to achieve a reduction in power consumption in the image pickup apparatus, the robot, the dust removal apparatus, or the image forming apparatus.

The present invention is not limited to the embodiments described above, but various changes and modifications are possible without departing from the spirit and the scope of the present invention.

This application claims the benefit of Japanese Patent Application No. 2013-269678 filed Dec. 26, 2013 and No.

2014-256709 filed Dec. 18, 2014, which are hereby incorporated by reference herein in their entirety.

REFERENCE SIGNS LIST 101 vibrating element
102 inductor
103 transformer
104 transformer primary winding coil
105 transformer secondary winding coil
106 capacitor with intrinsic capacitance Cd of vibrating element
107 equivalent coil with self-inductance Lm of vibrating element
108 equivalent capacitor with capacitance Cm of vibrating element
109 equivalent resistor with resistance value Rm of vibrating element
201 moving element
205 vibration-type actuator

The invention claimed is:

1. A vibrating-element driving circuit comprising:
a transformer; and
an inductor,
wherein an electro-mechanical energy conversion element is connected to a secondary coil of the transformer, the inductor is connected to a primary coil of the transformer, and
wherein when the inductance of the inductor is Le1, the inductance of the primary coil of the transformer is L1, and Ka=L1/Le1, then the following is satisfied: 1≤Ka≤10.

2. The vibrating-element driving circuit according to claim 1, wherein when an input voltage of the driving circuit is Vin, a voltage ON-time is Ton, and a maximum allowable input current is I, the total value of the inductance Le1 of the inductor and the inductance L1 of the transformer primary coil satisfies the following:

[Math. 1]

$$Le + L1 \geq \frac{Vin \times \text{Ton}}{I}.$$

3. The vibrating-element driving circuit according to claim 1, wherein when a peak frequency of electric resonance caused by elements including at least the inductor, the transformer, and the capacitance of the electro-mechanical energy conversion element is fe, and
a resonance frequency of a vibrating element including the electro-mechanical energy conversion element is fm, the following is satisfied:

$$1.30 \cdot fm < fe < 2.50 \cdot fm.$$

4. The vibrating-element driving circuit according to claim 1, wherein the inductor and the primary winding coil satisfy the following:

$$Ka \leq 5.$$

5. The vibrating-element driving circuit according to claim 1, wherein the inductor and the primary coil satisfy the following:

$$1.5 \leq Ka \leq 3.$$

6. The vibrating-element driving circuit according to claim 1, wherein the total value of the inductance L1 and the inductance Le1 is set such that when a voltage amplitude of a first harmonic of a frequency of an alternating voltage output from the driving circuit is V1, and a voltage amplitude of a third harmonic is V3,
then the inductor and the primary coil have inductance values such that a ratio, V3/V1, of the third harmonic of the alternating voltage is equal to or smaller than 0.5.

7. A vibration-type actuator comprising:
a vibrating element including an electro-mechanical energy conversion element; and
the vibrating-element driving circuit according to claim 1.

8. An image pickup apparatus comprising:
a lens;
an image sensor element disposed on an optical axis of the lens; and
the vibrating-element driving circuit according to claim 1.

9. An image generation apparatus comprising:
a transfer drum; and
the vibrating-element driving circuit according to claim 1, wherein the vibrating-element driving circuit is used to drive the transfer drum to rotate.

10. A dust removal apparatus comprising:
a substrate;
the vibrating element disposed on the substrate; and
the vibrating-element driving circuit according to claim 1.

11. An electronic device comprising the vibrating-element driving circuit according to claim 1.

12. A vibrating-element driving circuit comprising:
a transformer; and
an inductor connected to a secondary side of the transformer;
wherein an electro-mechanical energy conversion element is connected to a secondary coil of the transformer, and the inductor is connected to the electro-mechanical energy conversion element on the secondary side of the transformer, and
wherein when the inductance of the inductor is Le2, the inductance of the secondary coil of the transformer is L2, and Kb=L2/Le2, then the following is satisfied:

$$Kb \leq 10.$$

13. The vibrating-element driving circuit according to claim 12, wherein the total value of the inductance L2 and the inductance Le2 is set such that when a voltage amplitude of a first harmonic of a frequency of an alternating voltage output from the driving circuit is V1, and a voltage amplitude of a third harmonic is V3,
the secondary coil and the inductor have inductance values such that a ratio, V3/V1, of the third harmonic of the alternating voltage is equal to or smaller than 0.5.

14. The vibrating-element driving circuit according to claim 12, wherein
N electro-mechanical energy conversion elements are connected in parallel to the secondary coil, and
when an inductance of a secondary coil of the transformer is Ln2, the following is satisfied: Ln2=L2/N.

15. The vibrating-element driving circuit according to claim 1,
wherein N electro-mechanical energy conversion elements are connected in parallel to the secondary coil of the transformer, and
wherein when a turn ratio of the transformer is R and an inductance of the secondary coil of the transformer is Ln2, then the following is satisfied: Ln2=L1·R²/N.

16. A vibration-type actuator comprising:
a vibrating elements including an electro-mechanical energy conversion element; and the vibrating-element driving circuit according to claim 12.

17. An image pickup apparatus comprising:

a lens;

an image sensor element disposed on an optical axis of the lens; and the vibrating-element driving circuit according to claim 12.

18. An image generation apparatus comprising:

a transfer drum; and the vibrating-element driving circuit according to claim 12, wherein the vibrating-element driving circuit is used to drive the transfer drum to rotate.

19. A dust removal apparatus comprising:

a substrate;

the vibrating element disposed on the substrate; and the vibrating-element driving circuit according to claim 12.

20. An electronic device comprising the vibrating-element driving circuit according to claim 12.

* * * * *